US012720258B2

(12) United States Patent
Zhu et al.

(10) Patent No.: US 12,720,258 B2
(45) Date of Patent: Aug. 25, 2026

(54) MULTI-CHANNEL ECHO CANCELLATION METHOD AND RELATED APPARATUS

(71) Applicant: TENCENT TECHNOLOGY (SHENZHEN) COMPANY LIMITED, Shenzhen (CN)

(72) Inventors: Rui Zhu, Shenzhen (CN); Zhipeng Liu, Shenzhen (CN); Yuepeng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 18/456,054

(22) Filed: Aug. 25, 2023

(65) Prior Publication Data

US 2023/0403506 A1 Dec. 14, 2023

Related U.S. Application Data

(63) Continuation of application No. PCT/CN2022/122387, filed on Sep. 29, 2022.

(30) Foreign Application Priority Data

Nov. 26, 2021 (CN) ........................ 202111424702.9

(51) Int. Cl.
*H04R 3/02* (2006.01)

(52) U.S. Cl.
CPC ..................................... *H04R 3/02* (2013.01)

(58) Field of Classification Search
CPC ....................................................... H04R 3/02
See application file for complete search history.

(56) References Cited

U.S. PATENT DOCUMENTS

2002/0106016 A1 8/2002 Egelmeers et al.
2012/0290525 A1 11/2012 Malik et al.
(Continued)

FOREIGN PATENT DOCUMENTS

CN 102457632 B 7/2014
CN 108806709 A 11/2018
(Continued)

OTHER PUBLICATIONS

The World Intellectual Property Organization (WIPO) International Search Report for PCT/CN2022/122387 Jan. 9, 2023 14 Pages (including translation).
(Continued)

*Primary Examiner* — Daniel R Sellers
(74) *Attorney, Agent, or Firm* — Anova Law Group, PLLC

(57) ABSTRACT

A multi-channel echo cancellation method includes obtaining far-end audio signals outputted by channels, obtaining a filter coefficient matrix corresponding to a $k^{th}$ frame of microphone signal outputted by a target microphone and including frequency domain filter coefficients of filter sub-blocks corresponding to the channels, performing frame-partitioning and block-partitioning processing on the far-end audio signals to determine a far-end frequency domain signal matrix corresponding to the $k^{th}$ frame of microphone signal and including far-end frequency domain signals of the filter sub-blocks, performing filtering processing according to the filter coefficient matrix and the far-end frequency domain signal matrix to obtain an echo signal in the $k^{th}$ frame of microphone signal, and performing echo cancellation according to a frequency domain signal of the $k^{th}$ frame of microphone signal and the echo signal in the $k^{th}$ frame of microphone signal to obtain a near-end audio signal outputted by the target microphone.

18 Claims, 12 Drawing Sheets

(56) References Cited

U.S. PATENT DOCUMENTS

| | | | |
|---|---|---|---|
| 2017/0194015 A1 | 7/2017 | Buchner et al. | |
| 2018/0226954 A1* | 8/2018 | Valero | H03H 21/0027 |
| 2020/0091963 A1* | 3/2020 | Christoph | G10K 11/178 |
| 2020/0274972 A1 | 8/2020 | Weruaga | |
| 2022/0053268 A1* | 2/2022 | Yun | H04R 3/02 |

FOREIGN PATENT DOCUMENTS

| | | |
|---|---|---|
| CN | 110956973 A | 4/2020 |
| CN | 111213359 A | 5/2020 |
| CN | 111341336 A | 6/2020 |
| CN | 112242145 A | 1/2021 |
| CN | 112820311 A | 5/2021 |
| CN | 113470675 A | 10/2021 |
| CN | 113489855 A | 10/2021 |

OTHER PUBLICATIONS

Lu Caixia et al. A Delayless Frequency Domain Kalman Filter Screaming Suppression Algorithm for Fast Retracement. Journal of Electronics, vol. 46, Aug. 2018 (Aug. 31, 2018) ISSN: 0372-2112, pp. 1955-1957.

Independent Echo Path Modeling for Stereophonic Acoustic Echo Cancellation, Gao et al, Interspeech2020.

The European Patent Office (EPO) The Extended European Search Report for Application No. 22897378.0 Nov. 22, 2024 9 Pages.

Lino Carcia et al. "The conjugate gradient partitioned block frequency-domain adaptive filter for multichannel acoustic echo cancellation." 2006 14th European Signal Processing Conference. IEEE, 2006.

Fabian Kuech et al., "State-space architecture of the partitioned-block-based acoustic echo controller." 2014 IEEE International Conference on Acoustics, Speech and Signal Processing (ICASSP). IEEE, 2014.

China National Intellectual Property Administration (CNIPA) Office Action 1 for Application No. 202111424702.Dec. 9, 27, 2025 14 Pages (including translation).

Rui Zhu, et al. "A Partitioned-Block Frequency-Domain Adaptive Kalman Filter for Stereophonic Acoustic Echo Cancellation." Interspeech. 2021.

* cited by examiner

MULTI-CHANNEL ECHO CANCELLATION METHOD AND RELATED APPARATUS

CROSS-REFERENCE TO RELATED APPLICATIONS

This application is a continuation of International Application No. PCT/CN2022/122387, filed on Sep. 29, 2022, which claims priority to a Chinese Patent Application No. 2021114247029, filed with the China National Intellectual Property Administration on Nov. 26, 2021 and entitled "MULTI-CHANNEL ECHO CANCELLATION METHOD AND RELATED APPARATUS," which are incorporated herein by reference in their entirety.

FIELD OF THE TECHNOLOGY

This application relates to the technical field of audio processing, and in particular, to a multi-channel echo cancellation technology.

BACKGROUND OF THE DISCLOSURE

In many scenarios of audio processing, such as a video conference system and a hands-free telephone, multi-channel audio signals emitted by many people usually occurs at the same time. To clearly hear the multi-channel audio signals emitted by the many people at the same time, a voice communication device needs to perform echo cancellation on the obtained multi-channel audio signals. For example, assuming that in an A-terminal device and a B-terminal device that emit audio signals at the same time, the A terminal includes a microphone and a loudspeaker, and the B terminal also includes a microphone and a loudspeaker. A sound emitted by the loudspeaker of the B terminal may be transmitted to the A terminal through the microphone of the B terminal, resulting in an unnecessary echo, which needs to be cancelled.

Current echo cancellation method usually has large delay due to multiple echo paths, especially long echo paths. To reduce the delay, the order of a filter has to be increased, so that the calculation complexity of multi-channel echo cancellation is very high and the multi-channel echo cancellation cannot be really applied to production.

SUMMARY

In accordance with the disclosure, there is provided a multi-channel echo cancellation method including obtaining far-end audio signals outputted by channels, obtaining a filter coefficient matrix corresponding to a $k^{th}$ frame of microphone signal outputted by a target microphone and including frequency domain filter coefficients of filter sub-blocks corresponding to the channels, performing frame-partitioning and block-partitioning processing on the far-end audio signals to determine a far-end frequency domain signal matrix corresponding to the $k^{th}$ frame of microphone signal and including far-end frequency domain signals of the filter sub-blocks, performing filtering processing according to the filter coefficient matrix and the far-end frequency domain signal matrix to obtain an echo signal in the $k^{th}$ frame of microphone signal, and performing echo cancellation according to a frequency domain signal of the $k^{th}$ frame of microphone signal and the echo signal in the $k^{th}$ frame of microphone signal to obtain a near-end audio signal outputted by the target microphone.

Also in accordance with the disclosure, there is provided a computer device including a memory storing program codes and a processor configured to execute the program codes to obtain far-end audio signals outputted by channels, obtain a filter coefficient matrix corresponding to a $k^{th}$ frame of microphone signal outputted by a target microphone and including frequency domain filter coefficients of filter sub-blocks corresponding to the channels, perform frame-partitioning and block-partitioning processing on the far-end audio signals to determine a far-end frequency domain signal matrix corresponding to the $k^{th}$ frame of microphone signal and including far-end frequency domain signals of the filter sub-blocks, perform filtering processing according to the filter coefficient matrix and the far-end frequency domain signal matrix to obtain an echo signal in the $k^{th}$ frame of microphone signal, and perform echo cancellation according to a frequency domain signal of the $k^{th}$ frame of microphone signal and the echo signal in the $k^{th}$ frame of microphone signal to obtain a near-end audio signal outputted by the target microphone.

Also in accordance with the disclosure, there is provided a non-transitory computer-readable storage medium storing program codes that, when executed by a processor, cause the processor to obtain far-end audio signals outputted by channels, obtain a filter coefficient matrix corresponding to a $k^{th}$ frame of microphone signal outputted by a target microphone and including frequency domain filter coefficients of filter sub-blocks corresponding to the channels, perform frame-partitioning and block-partitioning processing on the far-end audio signals to determine a far-end frequency domain signal matrix corresponding to the $k^{th}$ frame of microphone signal and including far-end frequency domain signals of the filter sub-blocks, perform filtering processing according to the filter coefficient matrix and the far-end frequency domain signal matrix to obtain an echo signal in the $k^{th}$ frame of microphone signal, and perform echo cancellation according to a frequency domain signal of the $k^{th}$ frame of microphone signal and the echo signal in the $k^{th}$ frame of microphone signal to obtain a near-end audio signal outputted by the target microphone.

DESCRIPTION OF EMBODIMENTS

The embodiments of this application will be described with reference to the accompanying drawings.

Figure 1:
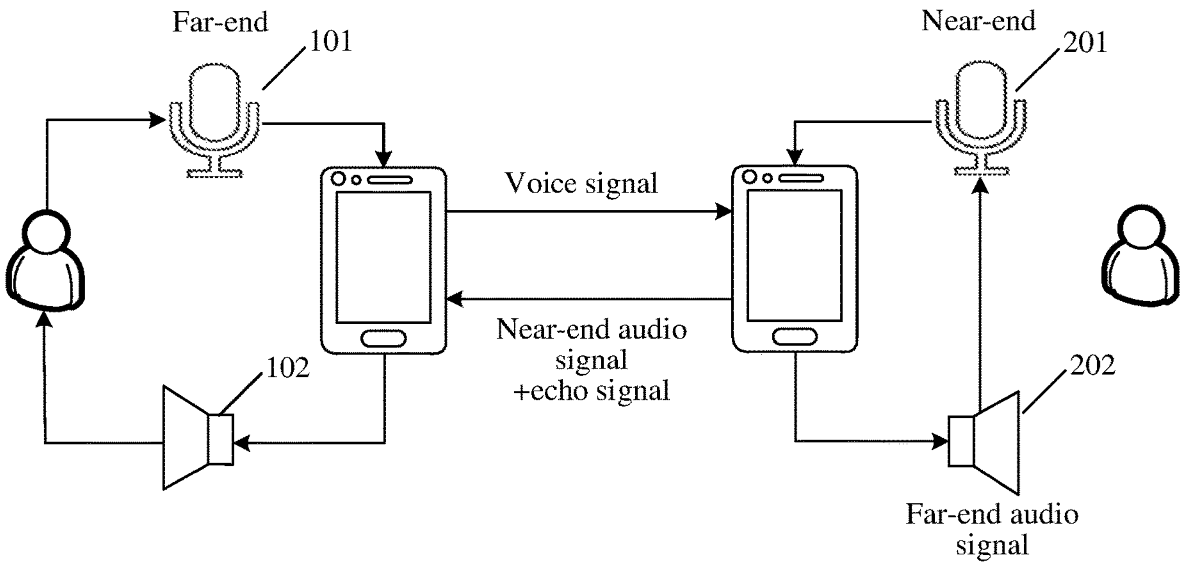
FIG. 1 is a schematic diagram showing a principle of echo cancellation according to an embodiment of this application.

Referring to FIG. 1, the voice of a far-end user is collected by a far-end microphone 101 and transmitted to a voice communication device. After wireless or wired transmission, the voice of the far-end user reaches a near-end voice communication device, and is played through a near-end loudspeaker 202. The played voice (which may be referred to as a far-end audio signal during signal transmission) is collected by a near-end microphone 201 to form an acoustic echo signal, and the acoustic echo signal is transmitted and returned to a far-end voice communication device and played through a far-end loudspeaker 102, so that the far-end user hears his/her own echo. In a case that a near-end user is also speaking at this time, the far-end user hears his/her own echo (which may be referred to as an echo signal during signal transmission) and the voice of the near-end user (which may be referred to as a near-end audio signal during signal transmission), that is, signals outputted by the far-end loudspeaker 102 include the echo signal and the near-end audio signal.

To enable the far-end user to hear the near-end user clearly (that is, the near-end audio signal), acoustic echo cancellation (AEC) is required, and will be referred to as echo cancellation for convenience of description. In related arts, large delay may be caused by an echo path and the like, and to reduce the delay, the order of the filter has to be increased, which may make the calculation complexity very high.

To solve the above technical problems, the embodiments of this application provide a multi-channel echo cancellation method. The method does not need to increase the order of the filter, but transforms the calculation into a frequency domain and combines the calculation with frame-partitioning and block-partitioning processing, thereby reducing the delay caused by the echo path and the like, greatly reducing the calculation amount and calculation complexity of multi-channel echo cancellation, and achieving better convergence performance.

The method provided by the embodiments of this application may be applied to a related application of voice communication scenarios or a related voice communication device, in particular to various scenarios of multi-channel voice communication requiring echo cancellation, such as an audio and video conference application, an online classroom application, a telemedicine application, and a voice communication device capable of performing hands-free calls. These are not limited by the embodiments of this application.

The method provided by the embodiments of this application may relate to the field of cloud technologies, such as cloud computing, cloud application, cloud education, and cloud conference.

For ease of understanding, a system architecture for implementing the multi-channel echo cancellation method provided by the embodiments of this application is described with reference to FIG. 2. The system architecture includes a terminal 201 and a terminal 202, where the terminal 201 and the terminal 202 are voice communication devices, the terminal 201 may be a near-end voice communication device, and the terminal 202 may be a far-end voice communication device. The terminal 201 includes multiple loudspeakers 2011 and at least one microphone 2012, where the multiple loudspeakers 2011 are configured to play a far-end audio signal transmitted by the terminal 202, and the at least one microphone 2012 is configured to collect a near-end audio signal and may collect the far-end audio signal played by the multiple loudspeakers 2011 so as to form an echo signal.

The terminal 202 may include a loudspeaker 2021 and a microphone 2022. Because the microphone 2012 collects the far-end audio signal played by the multiple loudspeakers 2011 while collecting the near-end audio signal, to prevent a user corresponding to the terminal 202 from hearing his/her own echo, the terminal 202 may perform the multi-channel echo cancellation method provided by the embodiments of this application. This embodiment does not limit the number of the loudspeaker 2021 and the microphone 2022 included in the terminal 202; and the number of the loudspeaker 2021 may be one or more, and the number of the microphone 2022 may also be one or more.

Each of the terminal 201 and the terminal 202 may be a smart phone, a tablet computer, a notebook computer, a desktop computer, a smart loudspeaker, a smart watch, a vehicle-mounted terminal, a smart television, a dedicated audio and video conference device and the like, but are not limited thereto. FIG. 1 takes the case where the terminal 201 and the terminal 202 are smart phones as an example for description, and users respectively corresponding to the terminal 201 and the terminal 202 may perform voice communication. The embodiments of this application mainly use the scenario where the audio and video conference applications are installed on the terminal 201 and the terminal 202 so as to perform audio and video conference as an example for description.

A server may support the terminal 201 and the terminal 202 in a background to provide a service (such as the audio and video conference) for the user. The server may be an independent physical server, a server cluster or a distributed system composed of multiple physical servers, or a cloud server providing a cloud computing service. The terminal 201, the terminal 202 and the server may be connected directly or indirectly through wired or wireless communication, which is not limited in this application.

In the embodiments of this application, the terminal 202 may obtain multiple far-end audio signals, where the multiple far-end audio signals are far-end audio signals respectively outputted by multiple channels. The multiple channels may be channels formed by the multiple loudspeakers 2011 in FIG. 1, and each of the loudspeaker 2011 corresponds to one channel.

The terminal 202 may perform echo cancellation through frame partitioning and block partitioning. Therefore, in a case that a target microphone outputs a $k^{th}$ microphone signal, the terminal 202 may obtain a first filter coefficient matrix corresponding to the $k^{th}$ microphone signal, where the first filter coefficient matrix includes frequency domain filter coefficients of filter sub-blocks corresponding to the multiple channels, thereby performing block partitioning on the filter to obtain the filter sub-blocks.

Then, the terminal 202 performs frame-partitioning and block-partitioning processing according to the multiple far-end audio signals, and determines a far-end frequency domain signal matrix corresponding to the $k^{th}$ frame of microphone signal (a frame of microphone signal is also referred to as a "microphone signal frame"), where the far-end frequency domain signal matrix includes the far-end frequency domain signals of the filter sub-blocks corresponding to the multiple channels. In this way, during filtering processing according to the first filter coefficient matrix and the far-end frequency domain signal matrix to obtain the echo signal in the $k^{th}$ frame of microphone signal, since a calculation is transformed into a frequency domain, and a Fourier transform has rapidness and is combined with the frame-partitioning and block-partitioning processing, it is unnecessary to wait for all the far-end audio signals to be outputted by the target microphone, so that delay caused by an echo path and the like is reduced, and the calculation amount and calculation complexity are greatly reduced.

Thereafter, the terminal 202 may quickly realize echo cancellation according to the frequency domain signal of the $k^{th}$ frame of microphone signal and the echo signal in the $k^{th}$ frame of microphone signal, and obtain the near-end audio signal outputted by the target microphone.

Figure 2:
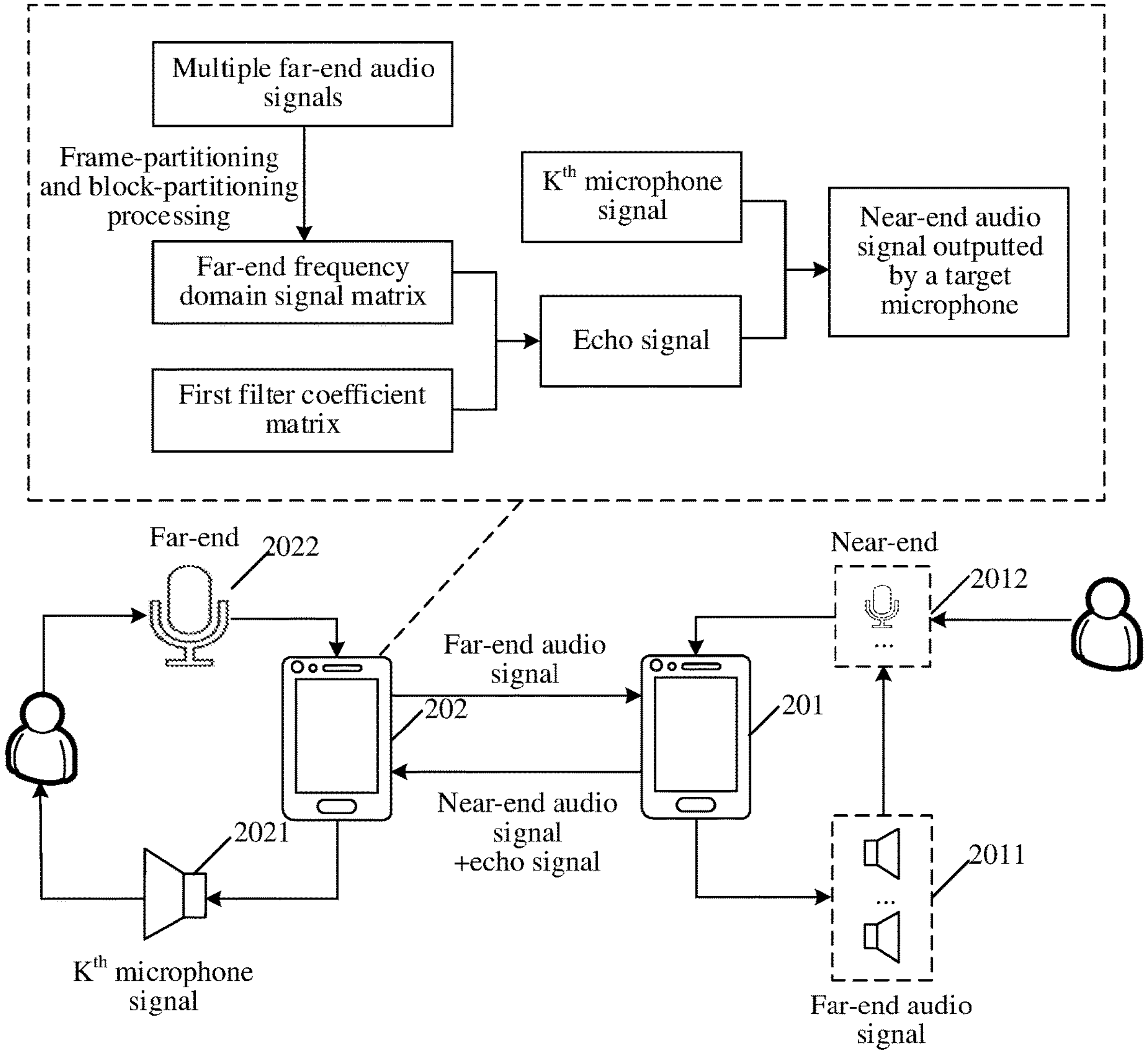
FIG. 2 is a schematic diagram of a system architecture of a multi-channel echo cancellation method according to an embodiment of this application.

In FIG. 2, the multi-channel echo cancellation method performed by the terminal 202 is taken as an example for description. In some possible implementations, the multi-channel echo cancellation method may be performed by the server corresponding to the terminal 202, or the multi-channel echo cancellation method may be performed by the terminal 202 and the server in cooperation. The embodiments of this application do not limit the performing subject of the multi-channel echo cancellation method.

It may be understood that the multi-channel echo cancellation method provided by the embodiments of this application may be integrated into an echo canceller, and the echo canceller is installed in the related application of the voice communication scenario or the related voice communication device, so as to cancel the echo of other users collected by the near-end voice communication device, retain only the voice spoken by local users, and improve voice communication experience.

Figure 3:
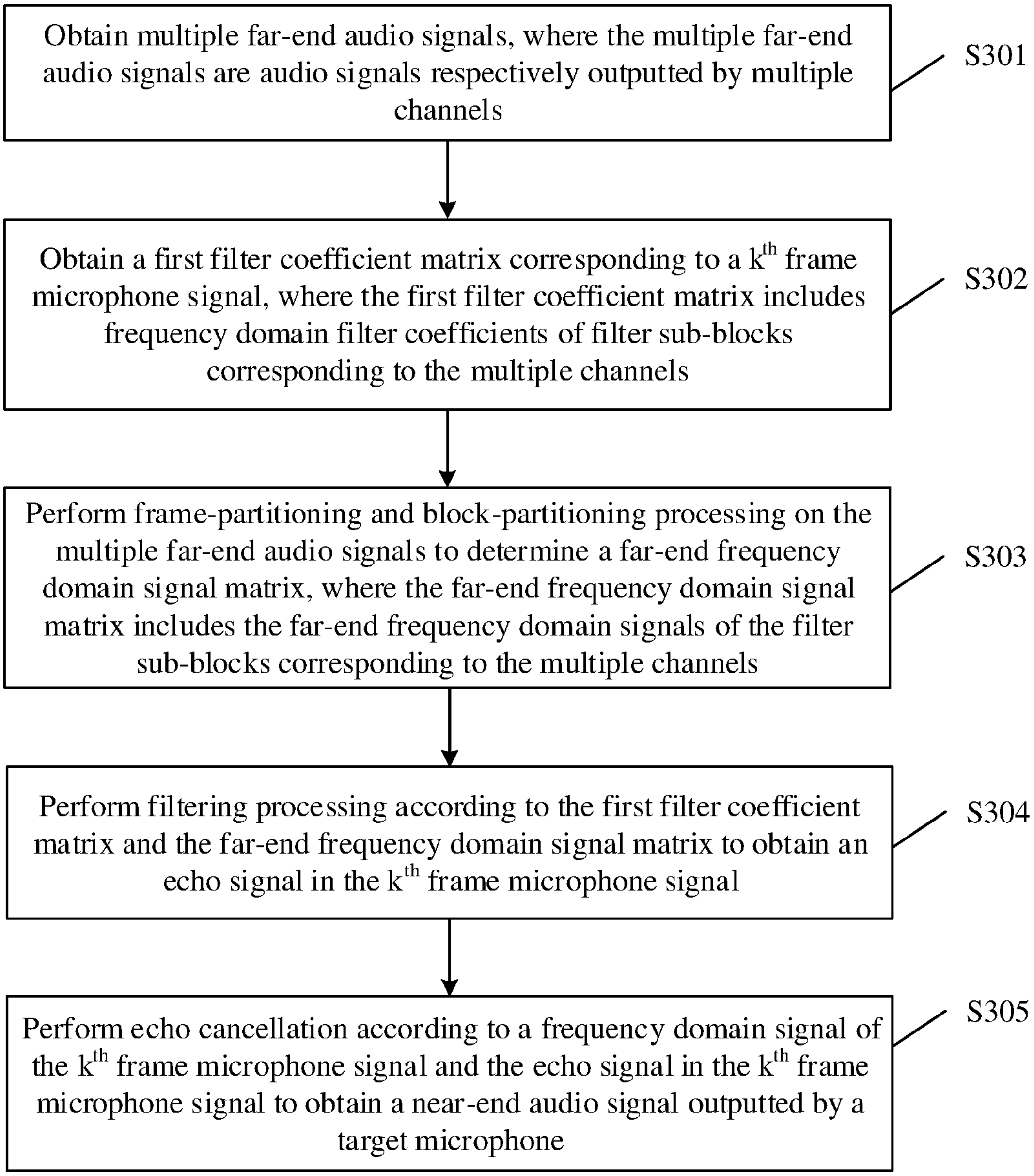
FIG. 3 is a flowchart of a multi-channel echo cancellation method according to an embodiment of this application.

The multi-channel echo cancellation method performed by the far-end terminal is described with reference to the accompanying drawings. Referring to FIG. 3, FIG. 3 shows a flowchart of a multi-channel echo cancellation method. The method includes:

S301: Obtain multiple far-end audio signal, where the multiple far-end audio signals are the audio signals outputted by the multiple channels, respectively.

Figure 4:
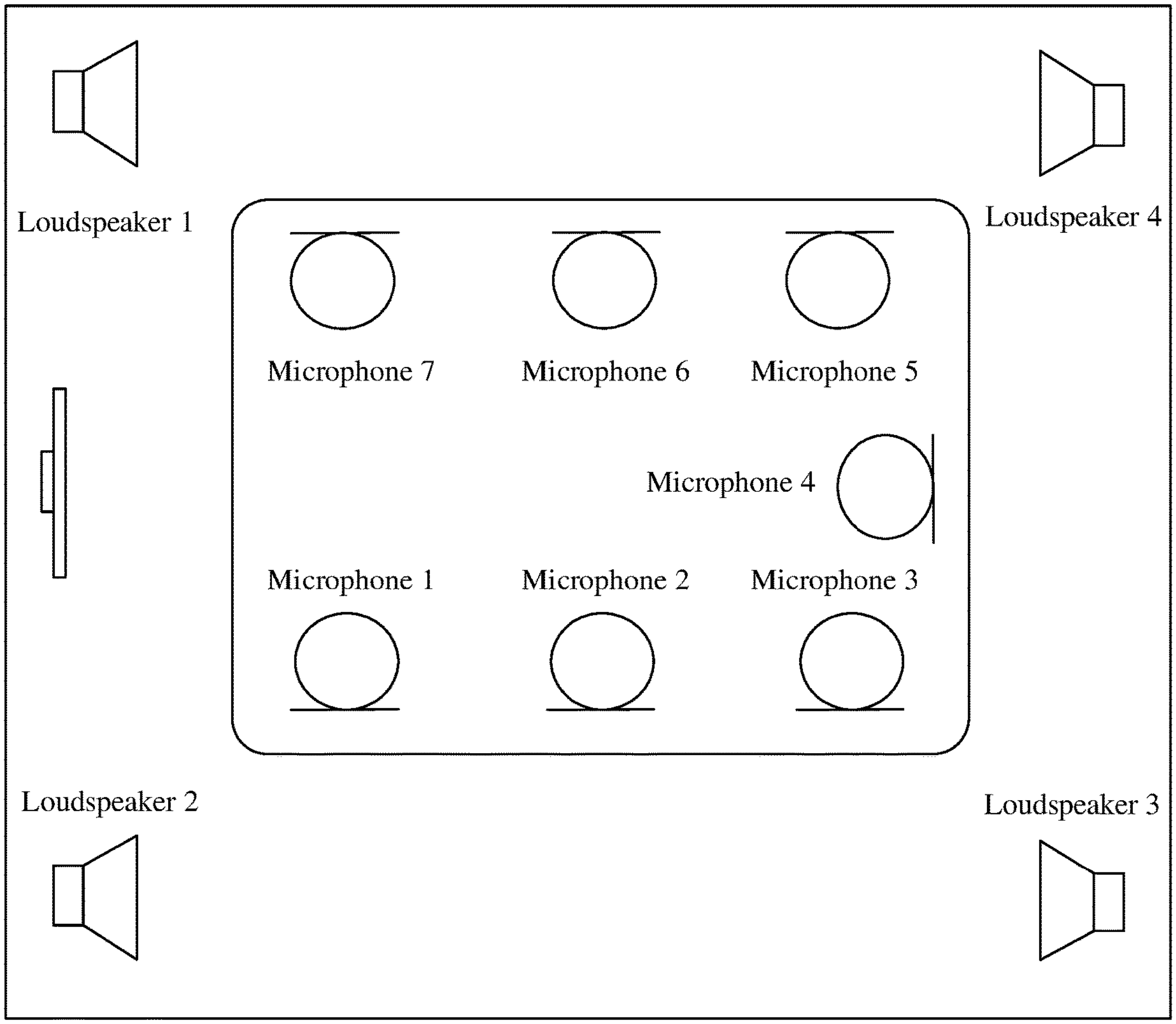
FIG. 4 is an example diagram showing multi-channel recording and playing of a dedicated audio and video conference device according to an embodiment of this application.

This embodiment takes the scenario of the audio and video conference as an example, where the far-end terminal and the near-end terminal may be any of the foregoing mentioned devices capable of performing audio and video conference, for example, may be a dedicated audio and video conference device. The dedicated audio and video conference device supports multi-channel recording and playing, thereby greatly improving the call experience of people. Referring to FIG. 4, FIG. 4 shows an example diagram of the multi-channel recording and playback of the dedicated audio and video conference device, including multiple loudspeakers (such as loudspeaker 1, loudspeaker 2, loudspeaker 3, and loudspeaker 4) and multiple microphones (such as microphone 1, microphone 2, . . . , and microphone 7). In some cases, one microphone may be included. FIG. 4 only takes multiple microphones as an example.

After being picked up again by the microphone, the far-end audio signals transmitted by the multiple loudspeakers will be transmitted back to the far-end terminal to form the echo signal. For example, in a room where the audio and video conference is held, the far-end audio signals played by the loudspeakers are reflected by obstacles such as walls, floors and ceilings, and the reflected voices and direct voices (that is, unreflected far-end audio signals) are picked up by microphones to form echo signals, so the multi-channel echo cancellation is required. In this scenario, the echo canceller may be installed in the dedicated audio and video conference device.

Figure 5:
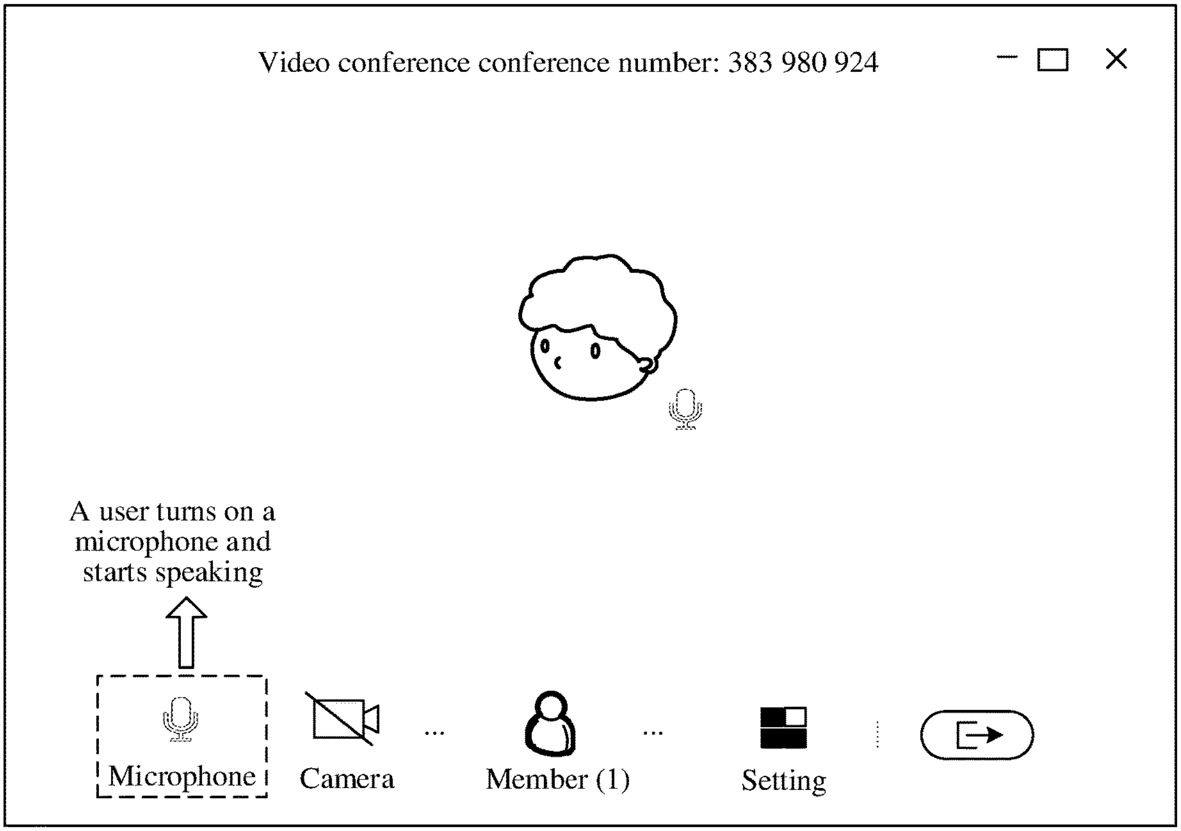
FIG. 5 is an example diagram of a user interface of an audio and video conference application according to an embodiment of this application.

Taking the audio and video conference application as an example, in the audio and video conference application, user A enters an online conference room, and user A turns on the microphone and starts to speak, as shown in a user interface in FIG. 5. At this time, the voice of user A is collected by the microphone, and the voices of other users in the online conference are also collected by the microphone after being played through the loudspeaker of the terminal, so that other users online can hear their own voices, that is, the echo signals, while hearing the voice of user A, so that the multi-channel echo cancellation is required. In this scenario, the echo canceller may be installed in the audio and video conference application.

Only one specific use method is shown here, and other methods, for example, changing icons, changing prompt text content or text position on the user interface are also covered in this application. In addition, the example is the user interface corresponding to the scenario where many people conduct the audio and video conference, and other scenarios, such as the online classroom application and the telemedicine application, are presented in a similar way to the above, which are not elaborated here.

In a multi-channel scenario, that is, the near-end terminal includes multiple loudspeakers, the multiple far-end audio signals are the audio signals outputted by the multiple loudspeakers included in the near-end terminal, and the far-end terminal may obtain multiple far-end audio signals. The embodiments of this application provide multiple exemplary methods to obtain the multiple far-end audio signals. One method may be that the far-end terminal directly determines the multiple audio signals according to the voice emitted by a corresponding user, and the other method may be that the near-end terminal determines the multiple far-end audio signals outputted by the loudspeaker, so that the far-end terminal may obtain the multiple far-end audio signals from the near-end terminal.

S302: Obtain the first filter coefficient matrix corresponding to the $k^{th}$ frame of microphone signal outputted by the target microphone, where the first filter coefficient matrix includes the frequency domain filter coefficients of the filter sub-blocks corresponding to the multiple channels.

During echo cancellation, a filter is usually used for simulating the echo path, so that the echo signal obtained by the far-end audio signal passing through the echo path can be simulated by a processing result of the filter on the far-end audio signal (the processing result may be obtained through operation of the filter coefficient of the filter and the far-end audio signal, such as the product operation). To reduce the delay of the echo cancellation, the far-end terminal may perform echo cancellation through frame partitioning and block partitioning. Therefore, During the echo cancellation performed for the $k^{th}$ microphone signal, the filter may be subjected to block partitioning.

To perform block-partitioning processing on the filter is to partition the filter with a certain length into a plurality of parts, each part may be referred to as a filter sub-block, and each filter sub-block has a same length. For example, assuming that the length of the filter is N, and the filter is partitioned into P filter sub-blocks, the length of each filter sub-block is L=N/P. By performing block-partitioning processing on the filter, the original processing of an input far-end audio signal by one filter may be transformed into a parallel processing of the far-end audio signal by P parallel filter sub-blocks.

The filtering function of the filter is embodied by filter coefficients. In a case that the filter is partitioned into multiple filter sub-blocks, each filter sub-block may filter a corresponding far-end audio signal in parallel. The filtering function of the filter sub-block also needs to be embodied by corresponding filter coefficients obtained after the block-partitioning processing, so that each filter sub-block has the corresponding filter coefficient. Therefore, for each filter sub-block, the filter coefficient is used for operating with the far-end audio signal on the filter sub-block, thereby realizing the parallel processing of the far-end audio signals by the P parallel filter sub-blocks.

In addition, because the Fourier transform is fast and combined with the frame-partitioning and block-partitioning processing, the delay caused by the echo path and the like may be better reduced, and the calculation amount and calculation complexity are greatly reduced. Therefore, the embodiments of this application may transform the filter coefficient of each filter sub-block to the frequency domain through the Fourier transform, thereby obtaining the frequency domain filter coefficient of each filter sub-block. The frequency domain filter coefficients of the filter sub-blocks corresponding to the multiple channels may form the filter coefficient matrix. In this way, for each frame of microphone signal used for performing operations with the corresponding far-end audio signal, that is, the filter coefficient matrix corresponding to the frame of microphone signal.

Based on this, when the $k^{th}$ frame of microphone signal outputted by the target microphone arrives, the far-end terminal may obtain the first filter coefficient matrix corresponding to the $k^{th}$ frame of microphone signal, where the first filter coefficient matrix includes the frequency domain filter coefficients of the filter sub-blocks corresponding to the multiple channels. The target microphone here refers to the microphone on the near-end terminal. The $k^{th}$ frame of microphone signal outputted by the target microphone is the $k^{th}$ frame of microphone signal collected by the target microphone, including the near-end audio signal and the echo signal (that is, the echo signal generated based on the multiple far-end audio signals), where k is an integer greater than or equal to 1.

In the embodiments of this application, the first filter coefficient matrix corresponding to the $k^{th}$ frame of microphone signal may be acquired by obtaining a second filter coefficient matrix corresponding to a (k−1)th frame of microphone signal. The second filter coefficient matrix includes the frequency domain filter coefficients of the filter sub-blocks corresponding to each channel when the target microphone outputs the $(k-1)^{th}$ frame of microphone signal, where k is an integer greater than 1. Further, the second filter coefficient matrix is iteratively updated to obtain the first filter coefficient matrix. That is, when a current frame of microphone signal (for example, the $k^{th}$ frame of microphone signal) arrives, the first filter coefficient matrix used for the multi-channel echo cancellation of the current frame of microphone signal may be iteratively updated according to the second filter coefficient matrix corresponding to a previous frame of microphone signal (for example, the $(k-1)^{th}$ frame of microphone signal), so that the filter coefficient matrix is continuously optimized and quickly converges.

The filter may be a Kalman filter and the filter sub-blocks may be obtained by performing block-partitioning processing on a frequency domain Kalman filter, where the frequency domain Kalman filter includes at least two filter sub-blocks. Block-partitioned frequency-domain Kalman filtering is performed through a block-partitioned frequency-domain Kalman filter without performing nonlinear preprocessing on the far-end audio signal and without performing double-end intercom detection, thereby avoiding correlation interference in the multi-channel echo cancellation, reducing the calculation complexity and improving the convergence efficiency.

To implement the steps shown in S302-305 and obtain the first filter coefficient matrix by iterative updating, a frequency domain observation signal model and a frequency domain state signal model may be constructed first. The principle of constructing the observation signal model and the state signal model is described below with reference to the block diagram of a multi-channel recording and playing system shown in FIG. 6.

The microphone signal y(n) at a discrete sampling time n is expressed as:

$$y(n) = \sum_{i=0}^{H-1} x_i^T(n) w_i(n) + v(n) \tag{1}$$

Figure 6:
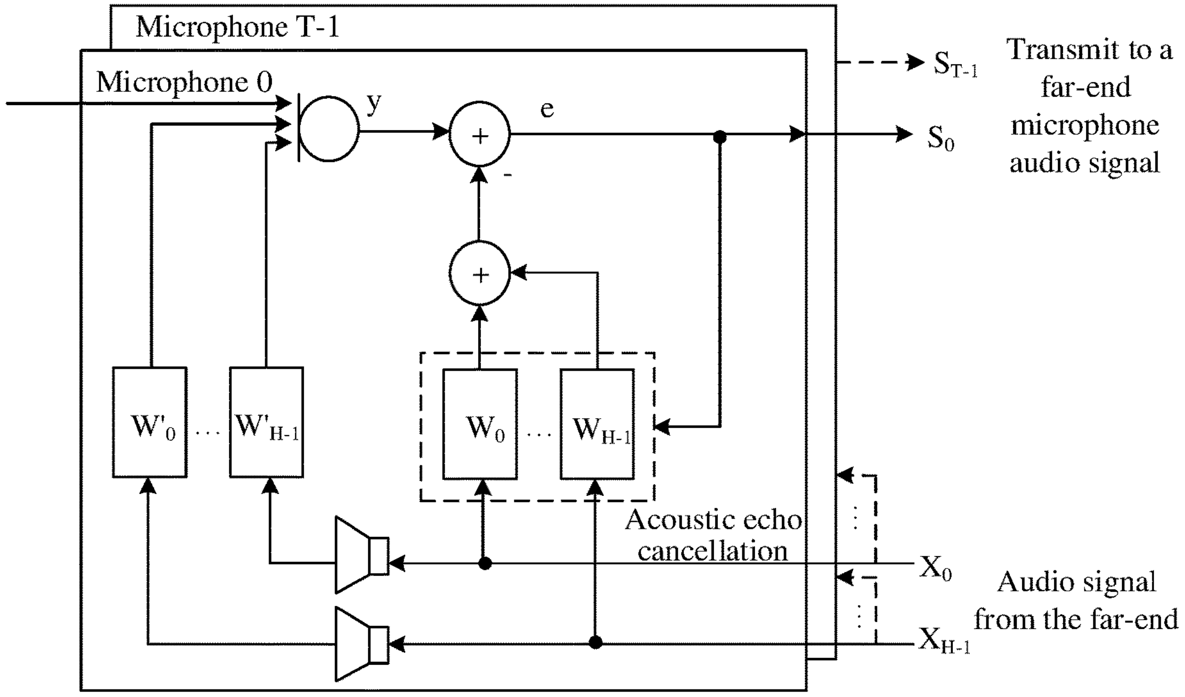
FIG. 6 is a block diagram of a multi-channel recording and playing system according to an embodiment of this application.

Superscript T represents transposition, $x_i(n)=[x_i(n), \ldots, x_i(n-N+1)]^T$ represents an input signal vector of an $i^{th}$ channel with a length of N, that is, a vector representation of the far-end audio signal, referring to $X_0, \ldots, X_H$ in FIG. 6; $w_i(n)=[w_{i,0}(n), \ldots, w_{i,N-1}(n)]^T$ represents the echo path (may also be referred to as a filter) between the $i^{th}$ channel with the length N and the microphone, referring to $W_0, \ldots,$ and $W_H$ in FIG. 6; v(n) represents the near-end audio signal, and usually, the near-end audio signal is the sum of the near-end voice signal and background noise; v(n) represents the near-end audio signal, which is usually the sum of the near-end voice signal and the background noise; and H represents the number of channels, that is, the number of loudspeakers.

Then, the observation signal model of the frequency domain is constructed based on a formula shown in (1). Frequency domain signal processing is based on frame processing. In a case that k represents the frame number, the echo path $w_i(n)$ is divided into P sub-blocks with equal length, and each sub-block may be referred to as the filter sub-block. In this scenario, when the target microphone outputs the $k^{th}$ frame of microphone signal, the filter coefficient of a $p^{th}$ filter sub-block corresponding to the $i^{th}$ channel is expressed as:

$$w_{i,p}(k) = [w_{i,pL}(k), \ldots, w_{i,pL+L-1}(k)]^T \tag{2}$$

where L represents the length of each filter sub-block, and the length of each filter sub-block is L=N/P. $w_{i,p}(k)$ is transformed to the frequency domain to obtain the following formula:

$$W_{i,p}(k) = F\begin{bmatrix} w_{i,p}(k) \\ 0_{L\times 1} \end{bmatrix} \quad (3)$$

where F is a Fourier transform matrix of M×M, (M=2L), and $0_{L\times 1}$ represents an all-zero column vector with the number of dimensions being L×1.

Further, based on $x_i(n)=[x_i(n), \ldots, x_i(n-N+1)]^T$, frame-partitioning and block-partitioning processing is performed on the far-end audio signal of the $p^{th}$ filter sub-block of the $i^{th}$ channel, and the far-end audio signal is transformed to the frequency domain:

$$x_{i,p}(k) = \mathrm{diag}\{F[x_i(kL-pL-L), \ldots, x_i(kL-pL+L-1)]^T\} \quad (4)$$

where diag{ } represents the operation of transforming a vector into a diagonal matrix. F[ ] represents the Fourier transform.

Based on the formula shown in (1), the $k^{th}$ frame of microphone signal is transformed into the frequency domain signal to obtain the following formula:

$$Y(k) = \sum_{i=0}^{H-1}\sum_{p=0}^{P-1} G_{01}X_{i,p}(k)W_{i,p}(k) + V(k) \quad (5)$$

where $Y(k)=F[0_{1\times L}, y(kL), \ldots, y(kL+L-1)]^T$ and $V(k)=F[0_{1\times L}, v(kL), \ldots, v(kL+L-1)]^T$ are respectively the frequency domain signal of the k-th frame of microphone signal and the frequency domain signal of the near-end audio signal, and $G_{01}$ is a windowing matrix, thereby ensuring that a result of cyclic convolution is consistent with that of linear convolution, and $0_{1\times L}$ is an all-zero matrix with the number of dimensions of 1×L.

$G_{01}$ may be expressed as:

$$G_{01} = F\begin{bmatrix} 0_L & 0_L \\ 0_L & I_L \end{bmatrix}F^{-1} \quad (6)$$

$0_L$ represents the all-zero matrix with the number of dimensions of L×L, $I_L$ represents an identity matrix with the number of dimensions of L×L, and F represents the Fourier transform matrix. Further, the formula shown in (5) is rewritten into a more compact matrix-vector product form:

$$Y(k) = X(k)W(k) + V(k) \quad (7)$$

where $X(k)=G_{01}[X_{1,0}(k), \ldots, X_{1,P-1}(k), \ldots, X_{H,0}(k), \ldots, X_{H,P-1}(k)]$ is a matrix composed of the frequency domain signals of the far-end audio signals of H channels, and may be referred to as the far-end frequency domain signal matrix; $X(k)=G_{01}[X_{1,0}(k), \ldots, X_{1,P-1}(k), \ldots, X_{H,0}(k), \ldots, X_{H,P-1}(k)]$ is the first filter coefficient matrix corresponding to the $k^{th}$ frame of microphone signal composed of all the filter sub-blocks of the H channels. So far, the frequency domain observation signal model under the framework of the multi-channel echo cancellation is constructed.

Then, a frequency domain state signal model is constructed. In a real acoustic environment, the change of the echo path with time is very complex, and it is almost impossible to describe this change accurately with a model. Therefore, the embodiments of this application use a first-order Markov model to model the echo path, that is, the frequency domain state signal model:

$$W(k) = AW(k-1) + \Delta W(k) \quad (8)$$

where A is a transition parameter that does not change with time, and W(k−1) is the second filter coefficient matrix corresponding to the $(k-1)^{th}$ frame of microphone signal;

$$\Delta W(k) = \left[\Delta W_{1,0}^T(k), \ldots, \Delta W_{1,P-1}^T(k), \ldots, \Delta W_{H,0}^T(k), \ldots, \Delta W_{H,P-1}^T(k)\right]^T$$

represents a process noise vector with the number of dimensions being HLP×1, which has a zero mean value and is a random signal independent of W(k).

The covariance matrix of ΔW(k) is:

$$\Psi_\Delta(k) = E\left[\Delta W(k)\Delta W^{\Phi}(k)\right] \quad (9)$$

where Φ represents a conjugate transposition, E represents computational expectation, and the covariance matrix of ΔW includes $(HP)^2$ submatrices with the number of dimensions being N×N. Further, assuming that the process noises between different channels are independent of each other, $\psi_\Delta(k)$ may be approximated as the diagonal matrix:

$$\Psi_\Delta(k) \approx (1-A^2)\mathrm{diag}\{W(k) \odot W^{\Phi}(k)\} \quad (10)$$

where ⊙ represents dot product operation, and diag{ } represents the operation of transforming the vector into the diagonal matrix. In essence, the above formula describes the change of the echo path with time by using the transfer parameter A and the energy of a real echo path. In a case that a noise signal covariance matrix (observation covariance matrix) can be accurately estimated, a process noise covariance matrix estimation method provided by the formula (10) may better cope with larger echo path changes, even for the larger parameter A.

Based on the frequency domain observation signal model and frequency domain state signal model established by the above methods, an accurate partitioned-block frequency domain Kalman filtering algorithm may be derived. When the partitioned-block frequency domain Kalman filtering algorithm is applied to the multi-channel echo cancellation, the second filter coefficient matrix is updated iteratively. The first filter coefficient matrix may be obtained by obtaining the observation covariance matrix corresponding to the $k^{th}$ frame of microphone signal and the state covariance matrix corresponding to the $(k-1)^{th}$ frame of microphone signal, where the observation covariance matrix and the state covariance matrix are diagonal matrices, respectively representing the uncertainty of a residual signal prediction value estimation and a state estimation in the Kalman filtering. According to the observation covariance matrix corresponding to the $k^{th}$ frame of microphone signal and the state covariance matrix corresponding to the $(k-1)^{th}$ frame of microphone signal, a gain coefficient is calculated, where the gain coefficient represents the influence of the residual signal prediction value estimation on the state estimation.

The first filter coefficient matrix is determined according to the second filter coefficient matrix, the gain coefficient and the residual signal prediction value corresponding to the $k^{th}$ frame of microphone signal, so that in the iterative updating process, the accuracy of the state estimation (that is, a new filter coefficient matrix such as the first filter coefficient matrix) is improved by continuously modifying the gain coefficient and the residual signal prediction value corresponding to the $k^{th}$ frame of microphone signal. In this case, an iterative update calculation formula of the first filter coefficient matrix may be:

$$\overline{W}_i(k) = A\left(\overline{W}_i(k-1) + K_i(k) * E(k)\right) \tag{11}$$

where iteratively represents the second filter coefficient matrix corresponding to the $(k-1)^{th}$ frame of microphone signal, $K_i(k)$ represents the gain coefficient, E(k) represents a frequency domain representation of the residual signal prediction value corresponding to the $k^{th}$ frame of microphone signal, and A represents the transition parameter. In a possible method, the observation covariance matrix corresponding to the $k^{th}$ frame of microphone signal may be obtained by the following steps: perform filtering processing according to the second filter coefficient matrix and the far-end frequency domain signal matrix, and obtain the residual signal prediction value corresponding to the $k^{th}$ frame of microphone signal; and calculate the observation covariance matrix corresponding to the $k^{th}$ microphone signal according to the residual signal prediction value corresponding to the $k^{th}$ microphone signal.

The filtering processing according to the second filter coefficient matrix and the far-end frequency domain signal matrix may be as follows: perform product summation on the second filter coefficient matrix and the far-end frequency domain signal matrix, and the residual signal prediction value corresponding to the $k^{th}$ frame of microphone signal may represent the echo signal possibly corresponding to a next frame of microphone signal predicted based on the second filter coefficient matrix. Specifically, according to the above established frequency domain observation signal model, the frequency domain of the residual signal prediction value corresponding to the $k^{th}$ frame of microphone signal may be determined as:

$$E(k) = Y(k) - \sum\nolimits_{i=0}^{p-1} \overline{X}_i(k)\overline{W}_i(k-1),\ p = HL \tag{12}$$

where E(k) represents the frequency domain representation of the residual signal prediction value corresponding to the $k^{th}$ frame of microphone signal, Y(k) represents the frequency domain signal of the $k^{th}$ frame of microphone signal, $\overline{X}_i(k)$ represents the far-end frequency domain signal matrix corresponding to the $k^{th}$ frame of microphone signal, $\overline{W}_i(k-1)$ represents the second filter coefficient matrix corresponding to the $(k-1)^1$ frame of microphone signal, H is the number of channels, L is the length of each filter sub-block, and i represents the subscript of each element in the matrix. E(k)=Fe(k) and Y(k)=Fy(k), where e(k) is the time domain representation of the residual signal prediction value corresponding to the $k^{th}$ frame of microphone signal, and y(k) is the time domain representation of the $k^{th}$ frame of microphone signal.

When the observation covariance matrix corresponding to the $k^{th}$ microphone signal is calculated, the calculation may be combined with the observation covariance matrix corresponding to the $(k-1)^{th}$ frame of microphone signal. When the filter is converged to a steady state, the residual signal prediction value is very close to a real noise vector, so the calculation formula of the observation covariance matrix corresponding to the $k^{th}$ frame of microphone signal is as follows:

$$\Psi^s(k) = \alpha\Psi^s(k-1) + (1-\alpha)\mathrm{diag}\left\{E(k) \odot E^{\phi}(k)\right\} \tag{13}$$

where $\psi^S(k)$ represents the observation covariance matrix corresponding to the $k^{th}$ frame of microphone signal, $\psi^S(k)$ represents the observation covariance matrix corresponding to the $(k-1)^{th}$ microphone signal, a is a smoothing factor and is set according to the actual experience, E(k) is the frequency domain representation of the residual signal prediction value corresponding to the $k^{th}$ frame of microphone signal, ⊙ represents dot product operation, diag{ } represents the operation of transforming the vector into the diagonal matrix, and p represents the conjugate transposition.

In this embodiment, the state covariance matrix corresponding to the $(k-1)^{th}$ frame of microphone signal may be obtained by calculating the state covariance matrix corresponding to the $(k-1)^{th}$ frame of microphone signal according to the second filter coefficient matrix.

Specifically, the calculation formula is as follows:

$$P_{i,j} = \begin{cases} A^2\begin{pmatrix} P_{i,j}(k-2) - \dfrac{R}{M}K_i(k-1) \\ \sum_{i=1}^{P} \overline{X}_i(k-1)P_{i,j}(k-2) \end{pmatrix} + \left(1-A^2\right)\overline{W}_i(k-1)\overline{W}_j^H(k-1), & i = j \\ 0, & i \neq j \end{cases} \tag{14}$$

where $P_{i,j}(k-1)$ represents the state covariance matrix corresponding to the $(k-1)^{th}$ frame of microphone signal, $P_{i,j}(k-2)$ represents the state covariance matrix corresponding to a $(k-2)^{th}$ frame of microphone signal, $K_i(k-1)$ represents the gain coefficient corresponding to $(k-1)^{th}$ microphone signal, $\overline{X}_i(k-1)$ represents the far-end frequency domain signal matrix corresponding to the $(k-1)^{th}$ frame of microphone signal, $\overline{W}_i(k-1)$ represents the second filter coefficient matrix corresponding to the $(k-1)^{th}$ frame of microphone signal, i and j are respectively the subscripts of elements in the matrix, R is a frame shift, and M is a frame length.

Some variables corresponding to the $(k-1)^{th}$ microphone signal, such as the gain coefficient and the second filter coefficient matrix, may be calculated according to the variables corresponding to the previous frame of microphone signal, or may be set initial values. Similarly, the state covariance matrix corresponding to the $(k-1)^{th}$ frame of microphone signal and the state covariance matrix corresponding to the $(k-2)^{th}$ frame of microphone signal may also be set initial values.

According to the observation covariance matrix corresponding to the $k^{th}$ frame of microphone signal and the state covariance matrix corresponding to the $(k-1)^{th}$ frame of microphone signal, the gain coefficient may be calculated by first calculating a gain estimation intermediate variable:

$$D_x(k) = \frac{R}{M}\sum_{i=1}^{p}\sum_{j=1}^{P}\bar{X}_i(k)P_{i,j}(k-1)\bar{X}_i^{\phi}(k) + \Psi^s(k) \quad (15)$$

where $D_X(k)$ is the gain estimation intermediate variable, R is the frame shift, M is the frame length, $\bar{X}_i(k)$ represents the far-end frequency domain signal matrix corresponding to the $k^{th}$ frame of microphone signal, $P_{i,j}(k-1)$ represents the state covariance matrix corresponding to $(k-1)^{th}$ frame of microphone signal, $$\bar{X}_j^{\Phi}(k)$$

represents the conjugate transposition of the far-end frequency domain signal matrix corresponding to the $k^{th}$ frame of microphone signal, $\psi^S(k)$ represents the observed covariance matrix corresponding to the $k^{th}$ frame of microphone signal, and i and j are respectively the subscripts of the elements in the matrix.

The formula of calculating the gain factor may be:

$$K_i(k) = \frac{R}{M}\sum_{i=1}^{P}P_{i,i}(k-1)\bar{X}_j^{\phi}(k)D_x^{-1}(k) \quad (16)$$

where $K_i(k)$ represents the gain coefficient, $P_{i,j}(k-1)$ represents the state covariance matrix corresponding to the $(k-1)^{th}$ frame of microphone signal, $$\bar{X}_i^{\phi}(k)$$

represents the conjugate transposition of the far-end frequency domain signal matrix corresponding to the $k^{th}$ frame of microphone signal, $$D_x^{-1}(k)$$

inversely transform the gain estimation intermediate variable, R is the frame shift, M is the frame length, and j is the subscript of the elements in the matrix.

S303: Perform frame-partitioning and block-partitioning processing on the multiple far-end audio signals to determine the far-end frequency domain signal matrix corresponding to the $k^{th}$ frame of microphone signal, where the far-end frequency domain signal matrix includes the far-end frequency domain signals of the filter sub-blocks corresponding to the multiple channels.

S304: Perform filtering processing according to the first filter coefficient matrix and the far-end frequency domain signal matrix to obtain the echo signal in the $k^{th}$ frame of microphone signal.

The far-end audio signal may include multiple frames, and the embodiments of this application are to perform the echo cancellation for each frame of microphone signal. During the echo cancellation for the $k^{th}$ frame of microphone signal, it is needed to select the far-end audio signal corresponding to the $k^{th}$ frame of microphone signal from multiple frames of far-end audio signals to realize the echo cancellation in units of frames.

In addition, to reduce the delay, in S302, the filter is subjected to block partitioning to perform parallel processing on the far-end audio signal through multiple filter sub-blocks obtained after block partitioning, that is, each filter sub-block is required to process a part of the far-end audio signal. Based on this, the far-end terminal is required to respectively perform frame-partitioning and block-partitioning processing according to the multiple far-end audio signals to obtain the far-end audio signal corresponding to the $k^{th}$ frame of microphone signal, and the far-end audio signal is partitioned into multiple parts with the same number as the filter sub-blocks, where each part corresponds to one filter sub-block, and multiple parts corresponding to the multiple frames of the far-end audio signals form the far-end audio signal matrix. Therefore, during the echo cancellation on the $k^{th}$ frame of microphone signal, parallel processing is performed by the multiple filter sub-blocks for the far-end audio signal corresponding to the $k^{th}$ frame of microphone signal, that is, each filter sub-block processes a corresponding part of the far-end audio signal.

Since the Fourier transform has rapidness and is combined with frame-partitioning and block-partitioning processing, it is unnecessary to wait for all the far-end audio signals to be outputted by the target microphone, thereby reducing the delay caused by the echo path and greatly reducing the calculation amount and calculation complexity. Therefore, the embodiments of this application may transform the far-end audio signal after frame-partitioning and block-partitioning processing to the frequency domain through the Fourier transform, thereby obtaining the frequency domain representation of the far-end audio signal, and correspondingly, the far-end audio signal matrix is transformed into the far-end frequency domain signal matrix.

The far-end frequency domain signal matrix includes the far-end frequency domain signals of the filter sub-blocks corresponding to the multiple channels. In this way, during the filtering processing according to the first filter coefficient matrix and the far-end frequency domain signal matrix to obtain the echo signal in the $k^{th}$ frame of microphone signal, the calculation is transformed into the frequency domain, thereby reducing the delay caused by the echo path and the like, and greatly reducing the calculation amount and calculation complexity.

In a possible implementation, the way to determine the far-end frequency domain signal matrix by performing frame-partitioning and block-partitioning processing according to the multiple far-end audio signals may be as follows: obtain the far-end frequency domain signal of each filter sub-block corresponding to the multiple channels according to a preset frame shift and a preset frame length by adopting an overlap reservation algorithm, and the far-end frequency domain signal of each filter sub-block corresponding to the multiple channels form the far-end frequency-domain signal matrix. The preset frame shift may be represented by R.

Based on construction process of the frequency domain observation signal model, frame-partitioning and block-partitioning processing is performed on the far-end audio signals $x_h(n)$ of H channels to obtain a vector $x_{h,l}(k)$, where the vector represents the far-end audio signal of an $l^{th}$ filter sub-block corresponding to an $h^{th}$ channel, and the length of each filter sub-block is 2N (equivalent to L in the construction process of the frequency domain observation signal model), and the frame shift is N (equivalent to the preset frame shift R), which is specifically expressed as:

$$x_{h,l}(k) = \{x_h[(k-l-1)N], \ldots , x_h[(k-l+1)N-1]\}^T \quad (17)$$

Frame-partitioning processing is performed on the target microphone signal, such as the microphone signal collected by a $t^{th}$ microphone, to obtain a vector $y_t(k)$. $y_t(k)$ represents the frequency domain signal of the $k^{th}$ frame microphone outputted by the target microphone, specifically expressed as follows, in the description of the following steps, a microphone number t is omitted:

$$y_t(k) = [y_t(kN), \ldots , y_t(kN+N-1)]^T \quad (18)$$

where T represents a transpose operation.

Frame partitioning and zero filling are performed on the residual signal prediction value e(k) corresponding to the $k^{th}$ frame of microphone signal:

$$e(k) = [0_{1\times N}, e(kN), \ldots , e(kN+N-1)]^T \quad (19)$$

where $0_{1\times N}$ represents an all-zero matrix with the number of dimensions of 1×N, and T represents the transposition operation.

The filter coefficient is determined:

$$w_h(n) = \left[w_{h,0}^T(n), \ldots , w_{h,L-1}^T(n)\right]^T \quad (20)$$

$$w_{h,l}(n) = [w_{h,lN}(n), \ldots , w_{h,(l+1)N-1}(n)]^T \quad (21)$$

where $w_h(n)$ is the time domain representation of the filter coefficient corresponding to the $h^{th}$ channel, $w_{h,l}(n)$ is the time domain representation of the filter coefficient of an $1^{th}$ filter sub-block corresponding to the $h^{th}$ channel, and n represents the discrete sampling time.

Fourier transform is performed respectively on time domain vectors $x_{h,l}(k)$ and $w_{h,l}(n)$ in (20) and (21) to obtain the frequency domain representations:

$$\overline{X}_i(k) = X_{h,l}(k) = \text{diag}\{Fx_{h,l}(k)\} \quad (22)$$

$$\overline{W}_i(k) = W_{h,l}(k) = F\left[w_{h,1}^T(kN),\ 0_{1\times N}\right]^T \quad (23)$$

where $\overline{X}_i(k)$ represents the far-end frequency domain signal matrix, $\overline{W}_i(k)$ represents the first filter coefficient matrix and represents the Fourier transform with the number of dimensions of 2N×2N, $$h = \frac{i - \text{mod}(i, L)}{L},\ l = \text{mod}(i, L),$$

mod is a remainder operation, and L is the number of the filter sub-blocks (equivalent to P in the construction process of the frequency domain observation signal model).

According to the above representations, the filtering processing according to the first filter coefficient matrix and the far-end frequency domain signal matrix may be a product summation operation of $\overline{X}_i(k)$ and $\overline{W}_i(k)$ to obtain the echo signal in the $k^{th}$ frame of microphone signal.

S305: Perform the echo cancellation according to the frequency domain signal of the $k^{th}$ frame of microphone signal and the echo signal in the $k^{th}$ frame of microphone signal to obtain the near-end audio signal outputted by the target microphone.

After the echo signal is obtained based on the above steps, the far-end terminal may subtract the echo signal from the frequency domain signal of the $k^{th}$ frame of microphone signal, thereby realizing the echo cancellation and obtaining the near-end audio signal outputted by the target microphone.

The target microphone is located on the voice communication device, where the voice communication device may include a microphone which is the target microphone. The obtained near-end audio signal outputted by the target microphone is used as the final signal to be played to the far-end user.

In some cases, the voice communication device may include multiple microphones, for example, T microphones, where T is an integer greater than 1. The target microphone is a $t^{th}$ microphone of the T microphones, where $0 \le t \le T-1$ and t is an integer. In this case, the obtained near-end audio signal outputted by the target microphone is the near-end audio signal outputted by each microphone. At this time, signal mixing may be performed on the near-end audio signals outputted by the T microphones, respectively, to obtain the target audio signal, thereby improving the quality of the target audio signal played to the far-end user through mixing.

Referring to FIG. 6, the near-end audio signals outputted by the T microphones are respectively $S_0, \ldots,$ and $S_{T-1}$. Signal mixing is performed on $S_0, \ldots,$ and $S_{T-1}$ to obtain the target audio signal.

In some cases, because the near-end audio signal may include the voice signal and the background noise, to obtain a more clear voice signal, the background noise included in the near-end audio signal may be cancelled. Because the T microphones may output T near-end audio signals, to avoid cancelling the background noise for each near-end audio signal, the background noise included in the target audio signal may be estimated after the target audio signal is obtained, so that the background noise may be cancelled from the target audio signal to obtain the near-end voice signal.

The background noise cancellation of each near-end audio signal is avoided by performing signal mixing first and then cancelling the background noise, thereby reducing the calculation amount and improving the calculation efficiency.

It can be seen from the technical solutions that in a scenario of the multi-channel echo cancellation, the multiple far-end audio signals outputted by the multiple channels may be obtained, and when the target microphone outputs the $k^{th}$ frame of microphone signal, the first filter coefficient matrix corresponding to the $k^{th}$ frame of microphone signal may be obtained, where the first filter coefficient matrix includes the frequency domain filter coefficients of the filter sub-blocks corresponding to the multiple channels. Then, frame-partitioning and block-partitioning processing is performed according to the multiple far-end audio signals to determine a far-end frequency domain signal matrix, where the far-end frequency domain signal matrix includes the frequency domain signals of the filter sub-blocks corresponding to the multiple channels. In this way, in a case that filtering processing is performed according to the first filter coefficient matrix and the far-end frequency domain signal matrix to obtain the echo signal in the $k^{th}$ frame of microphone signal, calculation is transformed into a frequency domain. Due to the rapidness of Fourier transform suitable for frequency domain calculation, the Fourier transform is combined with the frame-partitioning and block-partitioning processing, so that it is unnecessary to wait for all the far-end audio signals to be outputted by the target microphone, delay caused by an echo path and the like can be reduced, and the calculation amount and calculation complexity can be greatly reduced. Then, according to the frequency domain signal of the $k^{th}$ frame of microphone signal and the echo signal in the $k^{th}$ frame of microphone signal, the echo cancellation may be implemented quickly to obtain the near-end audio signal outputted by the target microphone. According to this solution, it is unnecessary to increase the order of the filter, but the calculation is transformed into the frequency domain and is combined with the frame-partitioning and block-partitioning processing, thereby reducing the delay caused by the echo path and the like, greatly reducing the calculation amount and calculation complexity of multi-channel echo cancellation, and achieving better convergence performance.

Figure 7:
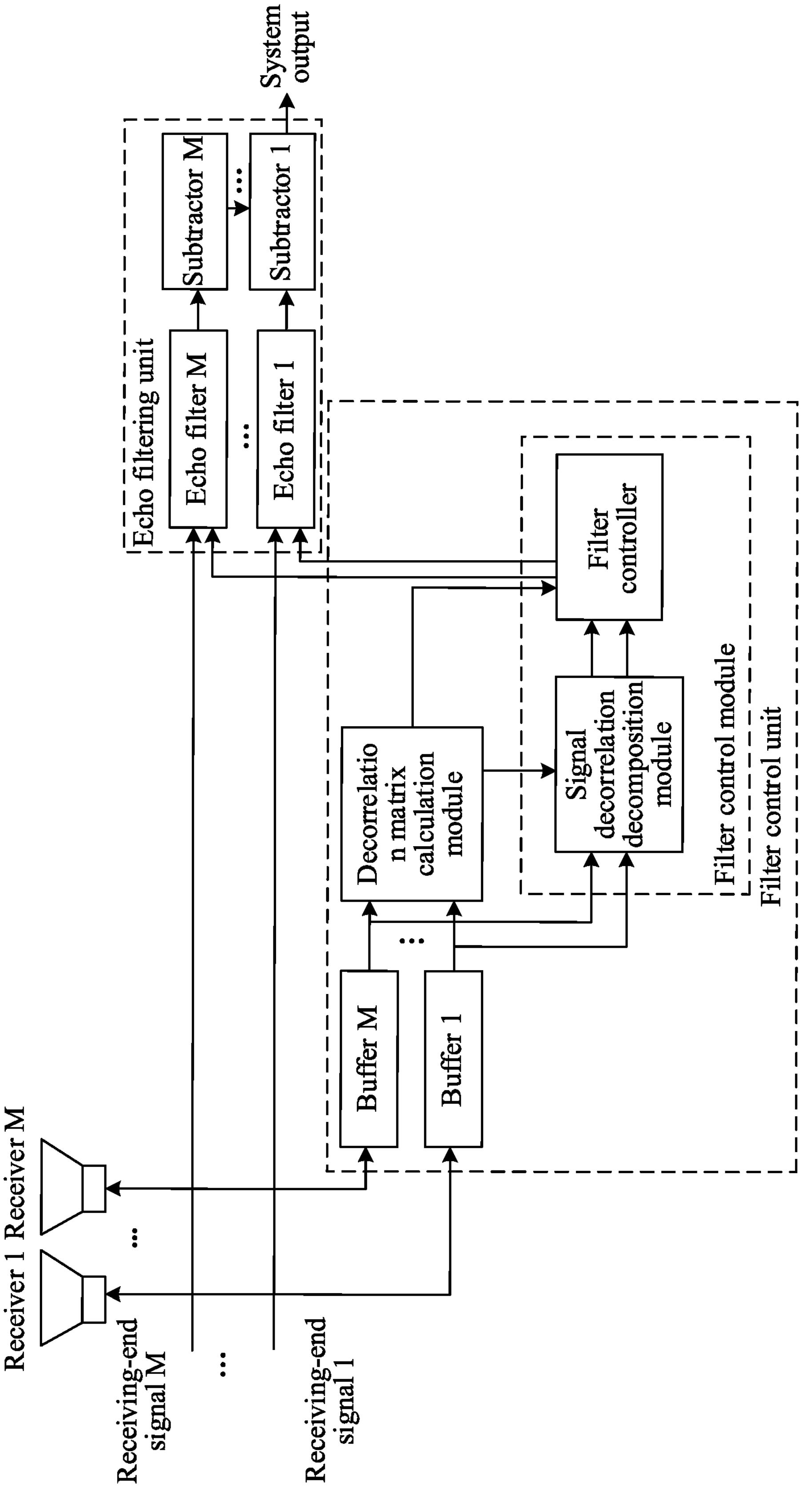
FIG. 7 is an example diagram of a multi-channel echo cancellation method.
Figure 8:
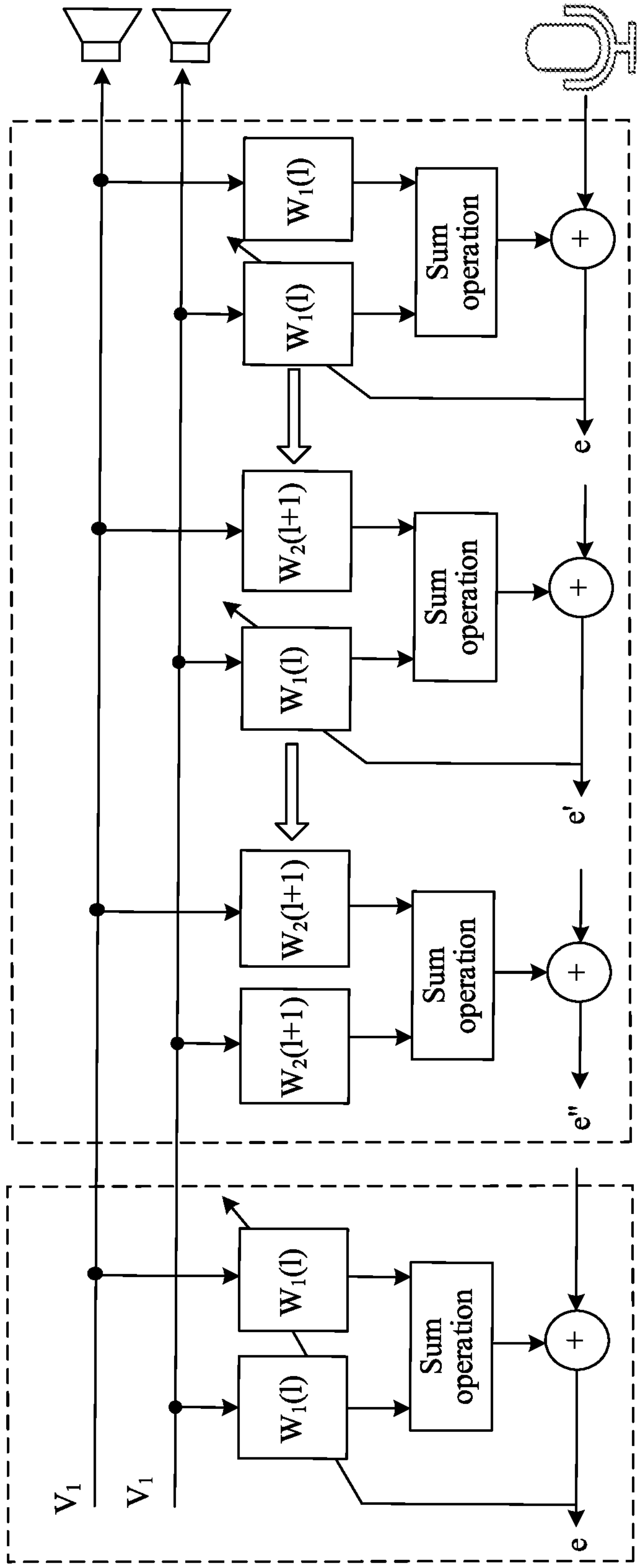
FIG. 8 is an example diagram of another multi-channel echo cancellation method.

FIGS. 7 and 8 schematically show two example multi-channel echo cancellation methods (Method 1 and Method 2, respectively). Method 1 is to use an echo filter to perform echo filtering on M paths of receiving-end signals to obtain M paths of filtered receiving-end signals, and subtract the M paths of filtered receiving-end signals from sending-end signals to obtain system output signals that cancel the echo of the receiving end; at the same time, a buffer (a buffer 1, . . . , and a buffer M) is used for buffering M paths of receiving-end signals and calculating a decorrelation matrix according to the buffered M paths of receiving-end signals within each preset length. The decorrelation matrix is used for decomposing the buffered M paths of receiving-end signals into M paths of decorrelated receiving-end signals and calculating the update amount of the echo filter according to the decorrelation matrix, the M paths of decorrelated receiving-end signals and the feedback system output signals. Method 1 actually introduces a preprocessing method. The preprocessing method can reduce the voice quality and the user experience while removing correlation between channels. At the same time, the setting of parameters needs to be balanced between the two.

Method 2 is to model each echo path independently, and finally copy independently modeled coefficients to a new filter. In a case that the echo path is stable, this solution may estimate each echo path more accurately. However, the essence is still a normalized least mean square (NLMS) method, which has the defects of low convergence speed, lack of stability to changing paths and the like. Furthermore, in a case that the number of channels increases, the implementation complexity will multiply.

Compared with Method 1 and Method 2, the method provided by the embodiments of this application has a significant performance advantage. It is unnecessary to perform any nonlinear preprocessing on the far-end audio signal and to adopt a double-end intercom detection method, thereby avoiding the correlation interference in the multi-channel echo cancellation, reducing the calculation complexity, and improving the convergence efficiency.

Then, taking the case where the filter is a partitioned-block frequency domain Kalman filter to perform block-partitioning frequency domain Kalman filtering as an example, in a case that the set transition parameter is A=0.9999, all the state covariance matrices are initialized to a unit matrix IN, and the performance of the multi-channel echo cancellation method (that is, the solution in FIG. 9 and FIG. 11) provided by Method 1, Method 2 and the embodiments of this application is evaluated by using MSD (MSD is a normalized system distance).

Figure 9:
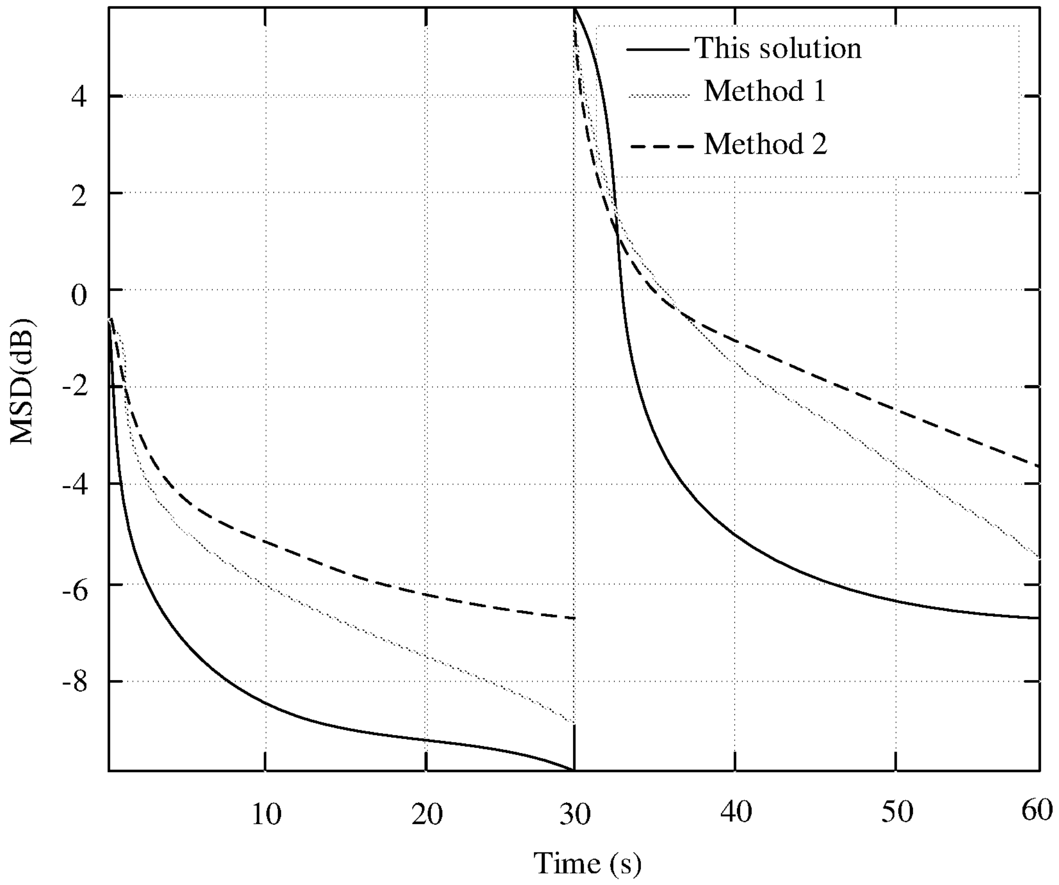
FIG. 9 is an example diagram showing MSD curves of the above three echo cancellation methods in a single-speaking state according to an embodiment of this application.

Referring to FIG. 9, FIG. 9 is an example diagram of an MSD curve of the above three echo cancellation methods in a single-speaking state, where the larger the value of the MSD is, the worse the performance is. It can be seen from FIG. 9 that before t=30, the multi-channel echo cancellation method provided by the embodiments of this application achieves better performance quickly, that is, the value of MSD decreases rapidly, and the echo path changes in seconds (an echo path mutation is simulated by multiplying the echo path by −1), thereby reducing the performance of all three echo cancellation methods and increasing the value of MSD immediately. However, the multi-channel echo cancellation method provided by the embodiments of this application achieves better performance quickly after the echo path mutation. It can be seen that the performance of the multi-channel echo cancellation method provided by the embodiments of this application is superior to that of Method 1 and Method 2.

Figure 10:
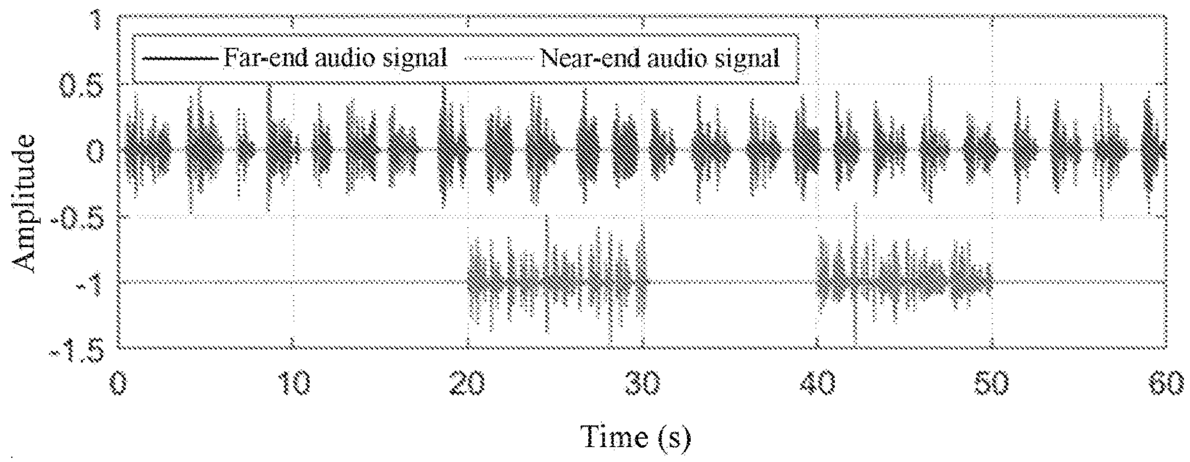
FIG. 10 is an example diagram showing a far-end audio signal and a near-end audio signal according to an embodiment of this application.
Figure 11:
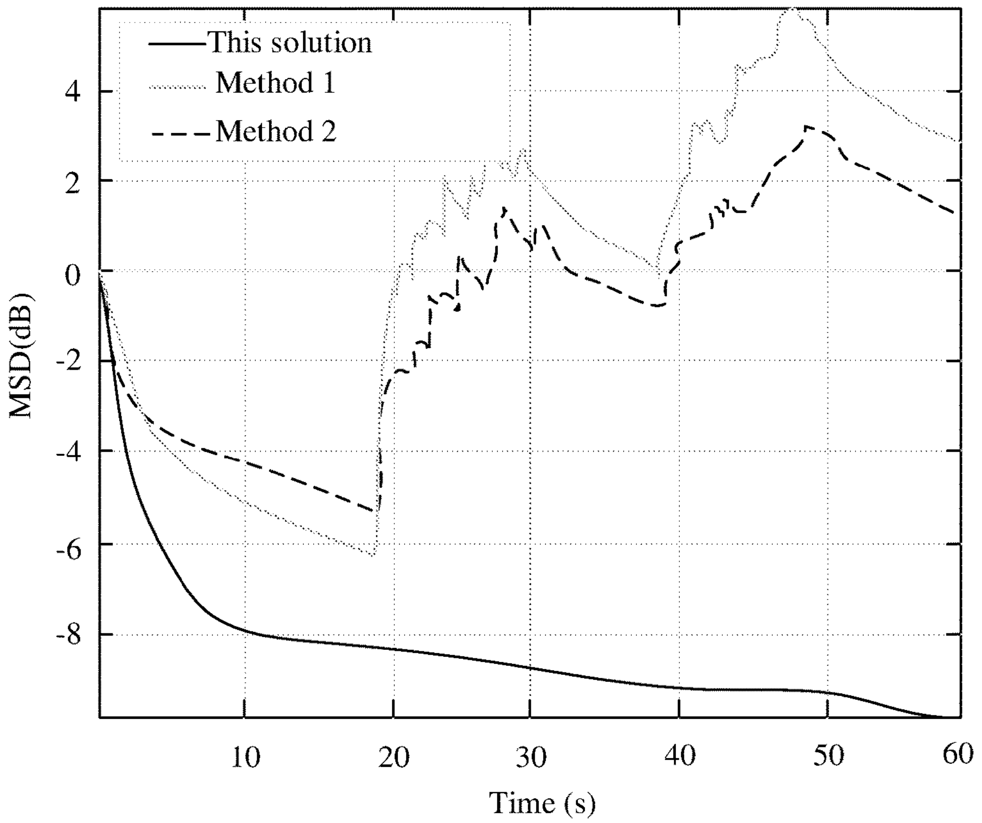
FIG. 11 is an example diagram showing MSD curves of the above three echo cancellation methods in a double-speaking state according to an embodiment of this application.

As shown in FIG. 10, in a case that both the far-end audio signal shown in FIG. 10 and the near-end audio signal shown in FIG. 10 are present in the microphone signal, that is, in a double-speaking state, the performance of the above three echo cancellation methods is evaluated. Referring to FIG. 11, FIG. 11 is an example diagram of the MSD curve of the above three echo cancellation methods in a double-speaking state. It can be seen from FIG. 10 that the near-end audio signal appears in 20s-30s and 40s-50s respectively. It can be seen from FIG. 11 that Method 1 and Method 2 diverge rapidly when there is interference of the near-end audio signal in two time intervals of 20s-30s and 40s-50s, that is, the value of MSD becomes obviously larger, resulting causing performance degradation. However, the multi-channel echo cancellation method provided by the embodiments of this application has a rapid decline in MSD, that is, the method has good robustness to the interference of the near-end audio signal in a case of no double-speaking detection.

The implementations provided in the above aspects may be further combined to provide more implementations.

Figure 12:
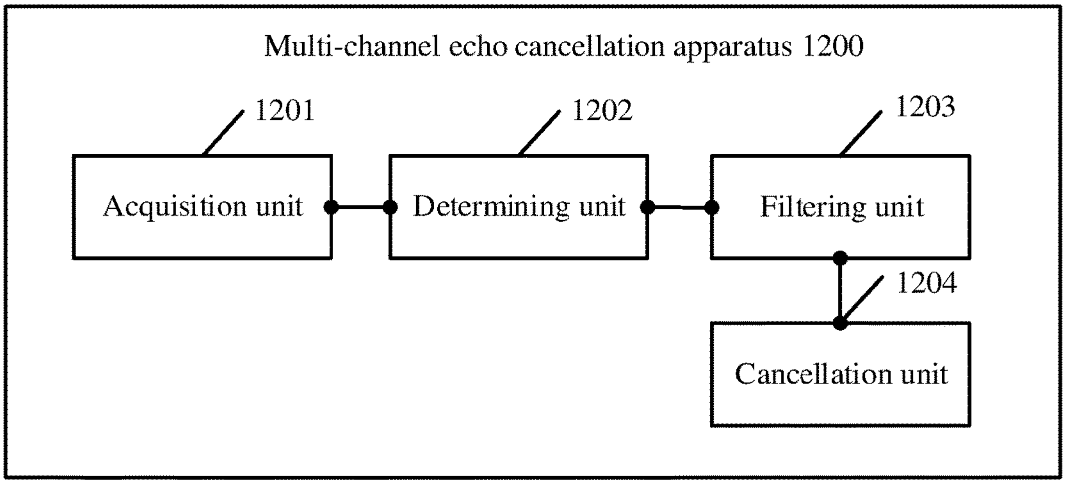
FIG. 12 is a structural diagram of a multi-channel echo cancellation apparatus according to an embodiment of this application.

Based on the multi-channel echo cancellation method provided by the embodiment corresponding to FIG. 3, the embodiments of this application further provide a multi-channel echo cancellation apparatus. Referring to FIG. 12, the apparatus 1200 includes an acquisition unit 1201, a determining unit 1202, a filtering unit 1203 and a cancellation unit 1204.

The acquiring unit 1201 is configured to obtain the multiple far-end audio signals, where the multiple far-end audio signals are audio signals respectively outputted by the multiple channels.

The acquisition unit 1201 is further configured to obtain the first filter coefficient matrix corresponding to the $k^{th}$ frame of microphone signal outputted by the target microphone, where the first filter coefficient matrix includes the frequency domain filter coefficients of the filter sub-blocks corresponding to the multiple channels, and k is an integer greater than or equal to 1.

The determining unit 1202 is configured to perform the frame-partitioning and block-partitioning processing on the multiple far-end audio signals to determine the far-end frequency domain signal matrix corresponding to the $k^{th}$ frame of microphone signal, where the far-end frequency domain signal matrix includes the far-end frequency domain signals of the filter sub-blocks corresponding to the multiple channels.

The filtering unit 1203 is configured to perform the filtering processing according to the first filter coefficient matrix and the far-end frequency domain signal matrix to obtain the echo signal in the $k^{th}$ frame of microphone signal.

The cancellation unit 1204 is configured to perform the echo cancellation according to the frequency domain signal of the $k^{th}$ frame of microphone signal and the echo signal in the $k^{th}$ frame of microphone signal to obtain the near-end audio signal outputted by the target microphone.

In a possible implementation, the acquisition unit 1201 is specifically configured to:

obtain a second filter coefficient matrix corresponding to the $(k-1)^{th}$ frame of microphone signal, where the second filter coefficient matrix includes the frequency domain filter coefficients of the filter sub-blocks corresponding to the multiple channels, and k is an integer greater than 1; and update the second filter coefficient matrix iteratively to obtain the first filter coefficient matrix.

In a possible implementation, the acquisition unit 1201 is specifically configured to:

- obtain the observation covariance matrix corresponding to the $k^{th}$ frame of microphone signal and the state covariance matrix corresponding to the $(k-1)^{th}$ frame of microphone signal, where the observation covariance matrix and the state covariance matrix are diagonal matrices;
- calculate a gain coefficient according to the observation covariance matrix corresponding to the $k^{th}$ frame of microphone signal and the state covariance matrix corresponding to the $(k-1)^{th}$ frame of microphone signal; and
- determine the first filter coefficient matrix according to the second filter coefficient matrix, the gain coefficient and the residual signal prediction value corresponding to the $k^{th}$ frame of microphone signal.

In a possible implementation, the acquisition unit 1201 is specifically configured to:

- perform filtering processing according to the second filter coefficient matrix and the far-end frequency domain signal matrix to obtain the residual signal prediction value corresponding to the $k^{th}$ frame of microphone signal;
- calculate the observation covariance matrix corresponding to the $k^{th}$ frame of microphone signal according to the residual signal prediction value corresponding to the $k^{th}$ frame of microphone signal; and
- calculate the state covariance matrix corresponding to the $(k-1)^{th}$ frame of microphone signal according to the second filter coefficient matrix.

In a possible implementation, the determining unit 1202 is configured to:

- obtain the far-end frequency domain signal of each filter sub-block corresponding to the multiple channels by adopting an overlap reservation algorithm according to a preset frame shift and a preset frame length; and
- use the far-end frequency domain signal of each filter sub-block corresponding to the multiple channels to form the far-end frequency domain signal matrix.

In a possible implementation, the target microphone is located on the voice communication device. The voice communication device includes T microphones, where T is an integer greater than 1, the target microphone is a $t^{th}$ microphone of the T microphones, $0 \le t \le T-1$ and t is an integer. The apparatus further includes an audio mixing unit.

The audio mixing unit is configured to perform signal mixing on the near-end audio signals respectively outputted by the T microphones to obtain a target audio signal.

In a possible implementation, the apparatus further includes an estimation unit.

The estimation unit is configured to estimate the background noise included in the target audio signal.

The cancellation unit 1204 is further configured to cancel the background noise from the target audio signal to obtain the near-end voice signal.

Figure 13:
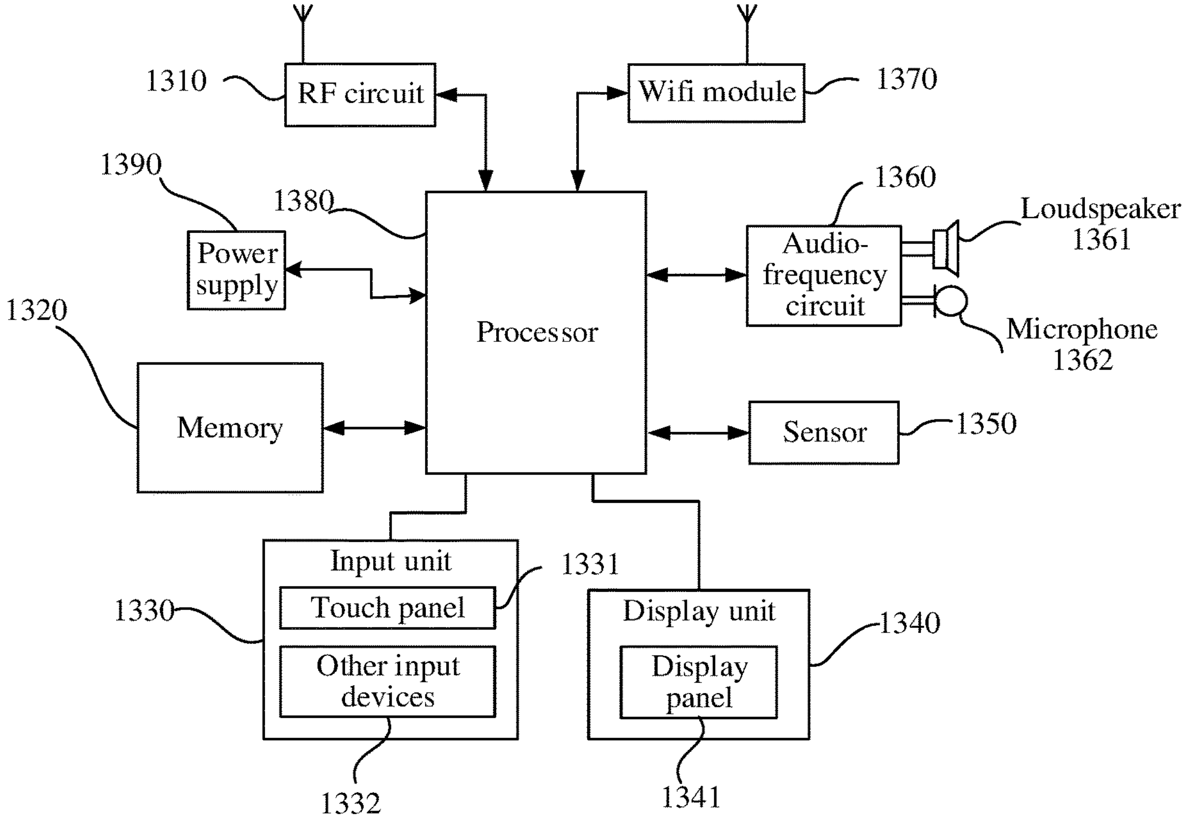
FIG. 13 is a structural diagram of a smart phone according to an embodiment of this application.

The embodiments of this application further provide a computer device. The computer device may be a voice communication device. For example, the voice communication device may be a terminal. Taking the case where the terminal is a smart phone as an example:

FIG. 13 is a block diagram of a part of a structure of a smart phone according to an embodiment of this application. Referring to FIG. 13, the smart phone includes: a radio frequency (RF) circuit 1310, a memory 1320, an input unit 1330, a display unit 1340, a sensor 1350, an audio-frequency circuit 1360, a wireless fidelity (WiFi) module 1370, a processor 1380, a power supply 1390 and other components. The input unit 1330 may include a touch panel 1331 and another input device 1332. The display unit 1340 may include a display panel 1341. The audio circuit 1360 may include a loudspeaker 1361 and a microphone 1362. Those skilled in the art may understand that the smart phone structure shown in FIG. 13 does not constitute a limitation to the smart phone, may include more or fewer parts than those shown in the figure, or may combine some parts, or may arrange different parts.

The memory 1320 may be configured to store software programs and modules, and the processor 1380 performs various functional applications and data processing of the smart phone by running the software programs and modules stored in the memory 1320. The memory 1320 may mainly include a program storage area and a data storage area. The program storage area may store an operating system, an application program required by at least one function (for example, a sound playing function and an image playing function), or the like. The data storage area may store data (such as audio data and a phone book) created according to the use of the smart phone. In addition, the memory 1320 may include a high-speed random access memory, and may further include a non-volatile memory, such as at least one disk storage device, a flash memory device or other volatile solid-state storage devices.

The processor 1380 is a control center of the smart phone, connects various parts of the whole smart phone by various interfaces and lines, and performs various functions and processes data of the smart phone by running or executing software programs and/or modules stored in the memory 1320 and recalling data stored in the memory 1320, thereby monitoring the whole smart phone. Optionally, the processor 1380 may include one or more processing units. In some embodiments, the processor 1380 may integrate an application processor and a modem processor, where the application processor mainly processes an operating system, a user interface, and an application program; and the modem processor mainly processes wireless communication. It may be understood that the modem processor described above may also not be integrated into the processor 1380.

In this embodiment, the processor 1380 in the smart phone may perform the multi-channel echo cancellation method provided by the embodiments of this application.

Figure 14:
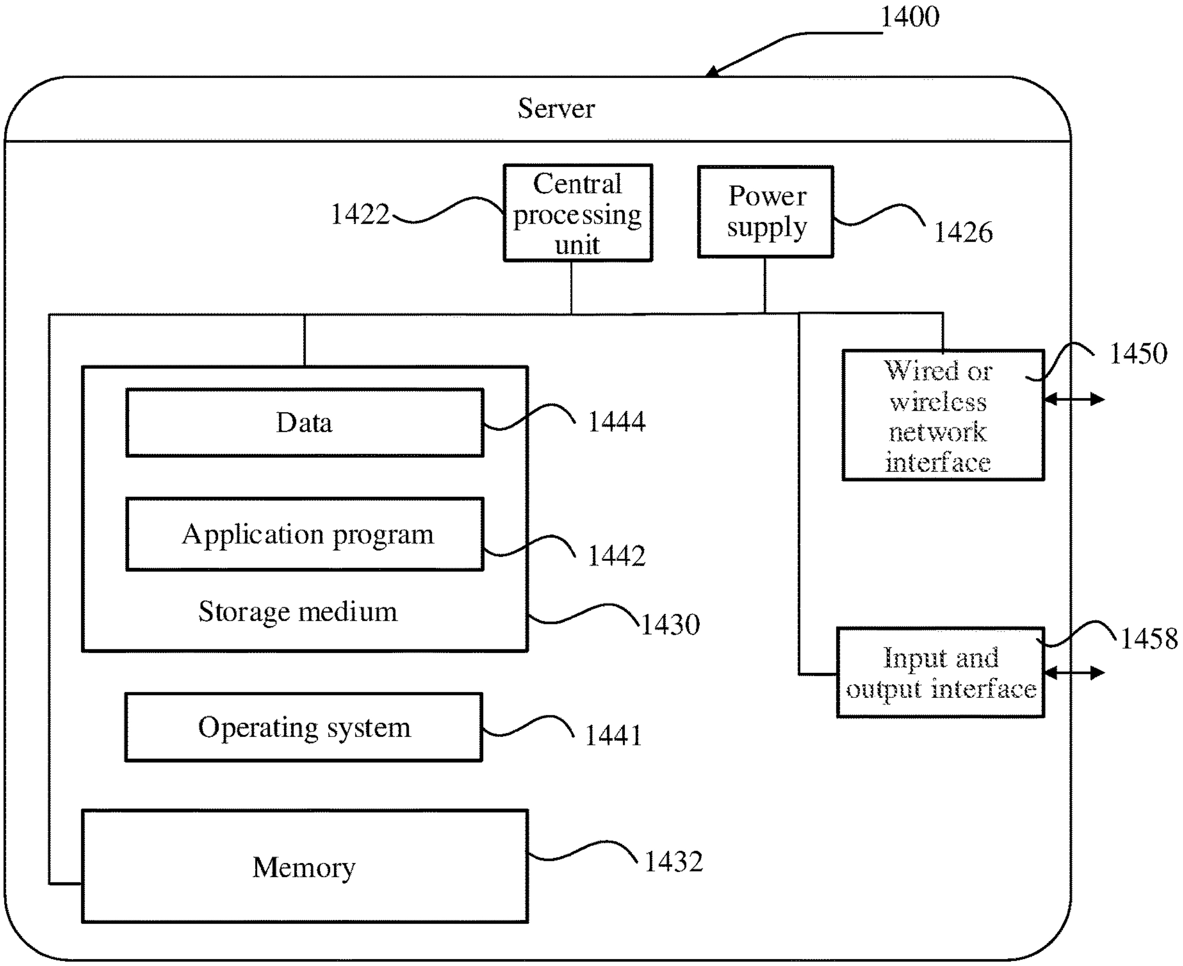
FIG. 14 is a structural diagram of a server according to an embodiment of this application.

The embodiments of this application further provide a server. Referring to FIG. 14, FIG. 14 is a structural diagram of a server 1400 according to an embodiment of this application. The server 1400 may vary greatly due to different configurations or performance, and may include one or more central processing units (CPU) 1422 (for example, one or more processors) and a memory 1432. The one or more storage media 1430 (for example, one or more mass storage devices) for storing an application program 1442 or data 1444. The memory 1432 and the storage medium 1430 may be transient storage or persistent storage. The program stored in the storage medium 1430 may include one or more modules (not shown in the figure). Each of the modules may include a series of instruction operations in the server. Further, the central processor 1422 may be configured to communicate with the storage medium 1430 to perform a series of instruction operations in the storage medium 1430 on the server 1400.

The server 1400 may further include one or more power supplies 1426, one or more wired or wireless network interfaces 1450, one or more input and output interfaces 1458, and/or one or more operating systems 1441, such as Windows Server™, Mac OS X™, Unix™ Linux™ and FreeBSD™.

In this embodiment, the steps performed by the central processor 1422 in the server 1400 may be implemented based on the structure shown in FIG. 14.

According to one aspect of this application, a computer-readable storage medium is provided. The computer-readable storage medium is configured to store program codes, and the program codes are used for performing the multi-channel echo cancellation method in the foregoing embodiments.

According to one aspect of this application, a computer program product or a computer program is provided. The computer program product or the computer program includes a computer instruction, and the computer instruction is stored in the computer-readable storage medium. The processor of the computer device reads the computer instruction from the computer-readable storage medium, and executes the computer instruction to cause the computer device to perform the methods provided in various optional implementations of the above embodiments.

The descriptions of the process or the structure corresponding to the accompanying drawings have different emphases, and parts not detailed in a certain process or structure may be referred to the related descriptions of other processes or structures.

Terms such as "first," "second," "third" and "fourth" (in a case that they are present) in the specification of this application and in the above accompanying drawings are intended to distinguish similar objects but do not necessarily describe a specific order or sequence. It is to be understood that the data used in such a way is interchangeable in proper circumstances, so that the embodiments of this application described herein, for example, can be implemented in a sequence other than the sequence illustrated or described herein. In addition, the terms "including" and "having" and any variations thereof are intended to cover non-exclusive inclusion, for example, the processes, methods, systems, products, or devices including a series of steps or units are not necessarily limited to those steps or units explicitly listed, but may include steps or units not explicitly listed, or the other steps or units inherent to the processes, methods, systems, products or devices.

In several embodiments of this application, it is to be understood that the disclosed system, apparatus and method may be implemented in other manners. For example, the embodiments of the apparatus described above is only schematic, for example, division into the units is only logical function division. There may be other division, manners in actual implementation, for example, multiple units or components may be combined or integrated into other systems, or some features may be ignored or not performed. In addition, the displayed or discussed mutual couplings or direct couplings or communication connections may be implemented by using some interfaces. The indirect couplings or communication connections between apparatuses or units may be implemented in electronic, mechanical, or other forms.

The units described as separate parts may or may not be physically separated, and parts shown as units may or may not be physical units, that is, may be located in one location, or may be distributed on multiple network units. Some or all of the units may be selected according to actual needs to achieve the objective of the solutions of the embodiments.

In addition, functional units in the embodiments of the present application may be integrated into one processing unit, or each of the units may exist alone physically, or two or more units are integrated into one unit. The foregoing integrated unit may be implemented either in the form of hardware or in the form of software functional units.

The integrated unit, if implemented in the form of a software functional unit and sold or used as a stand-alone product, may be stored in a computer readable storage medium. Based on this understanding, the essence, or the part which contributes to conventional technologies, or all or part of the technical solution of this application may be embodied in the form of a software product, and the computer software product is stored in a storage medium, including several instructions to enable a computer device (which may be a personal computer, a server, or a network device) to perform all or part of the steps of the methods described in the embodiments of this application. The storage medium includes: any medium that can store program code, such as a USB flash disk, a removable hard disk, a read-only memory (ROM), a random access memory (RAM), a magnetic disk, or an optical disc.

As described above, the above embodiments are only used to illustrate the technical solutions of this application, but not to limit them; although this application has been described in detail with reference to the foregoing embodiments, those of ordinary skill in the art may understand that: they can still make modifications to the technical solutions described in the foregoing examples, or make equivalent replacement to some technical characteristics; and these modifications or replacements do not make the essence of the corresponding technical solutions deviate from the spirit and scope of the technical solutions in the embodiments of this application.

What is claimed is:

1. A multi-channel echo cancellation method, performed by a computer device, comprising:

obtaining a plurality of far-end audio signals outputted by a plurality of channels, respectively;

obtaining a first filter coefficient matrix corresponding to a $k^{th}$ frame of microphone signal outputted by a target microphone, comprising:

obtaining a second filter coefficient matrix corresponding to a $(k-1)^{th}$ frame of microphone signal outputted by the target microphone, the first and second filter coefficient matrices respectively including frequency domain filter coefficients of filter sub-blocks corresponding to the plurality of channels, and k being an integer greater than or equal to 1; and determining the first filter coefficient matrix according to the second filter coefficient matrix, a gain coefficient, and a residual signal prediction value corresponding to the $k^{th}$ frame of microphone signal, wherein the residual signal prediction value corresponding to the $k^{th}$ frame of microphone signal represents an echo signal corresponding to a next frame of microphone signal predicted based on the second filter coefficient matrix;

performing frame-partitioning and block-partitioning processing on the plurality of far-end audio signals to determine a far-end frequency domain signal matrix corresponding to the $k^{th}$ frame of microphone signal, the far-end frequency domain signal matrix including far-end frequency domain signals of the filter sub-blocks;

performing filtering processing according to the filter coefficient matrix and the far-end frequency domain signal matrix to obtain an echo signal in the $k^{th}$ frame of microphone signal; and performing echo cancellation according to a frequency domain signal of the $k^{th}$ frame of microphone signal and the echo signal in the $k^{th}$ frame of microphone signal to obtain a near-end audio signal outputted by the target microphone.

2. The method according to claim 1, wherein determining the first filter coefficient matrix comprises: updating the second filter coefficient matrix iteratively to obtain the first filter coefficient matrix, and the gain coefficient is obtained by:

obtaining an observation covariance matrix corresponding to the $k^{th}$ frame of microphone signal, and obtaining a state covariance matrix corresponding to the $(k-1)^{th}$ frame of microphone signal, the observation covariance matrix and the state covariance matrix being diagonal matrices; and calculating the gain coefficient according to the observation covariance matrix corresponding to the $k^{th}$ frame of microphone signal and the state covariance matrix corresponding to the $(k-1)^{th}$ frame of microphone signal.

3. The method according to claim 2, wherein:

obtaining the observation covariance matrix corresponding to the $k^{th}$ frame of microphone signal includes:

performing filtering processing according to the second filter coefficient matrix and the far-end frequency domain signal matrix to obtain the residual signal prediction value corresponding to the $k^{th}$ frame of microphone signal; and calculating the observation covariance matrix corresponding to the $k^{th}$ frame of microphone signal according to the residual signal prediction value corresponding to the $k^{th}$ frame of microphone signal; and obtaining the state covariance matrix corresponding to the $(k-1)^{th}$ frame of microphone signal includes:

calculating the state covariance matrix corresponding to the $(k-1)^{th}$ frame of microphone signal according to the second filter coefficient matrix.

4. The method according to claim 1, wherein performing frame-partitioning and block-partitioning processing on the plurality of far-end audio signals to determine a far-end frequency domain signal matrix includes:

obtaining the far-end frequency domain signals of the filter sub-blocks corresponding to the plurality of channels using an overlap reservation algorithm according to a preset frame shift and a preset frame length; and forming the far-end frequency domain signal matrix using the far-end frequency domain signals of the filter sub-blocks corresponding to the plurality of channels.

5. The method according to claim 1, wherein:

the target microphone is one of a plurality of microphones of a voice communication device;

the method further comprising:

performing signal mixing on near-end audio signals outputted by the plurality of microphones, respectively, to obtain a target audio signal.

6. The method according to claim 5, further comprising:

estimating background noise included in the target audio signal; and cancelling the background noise from the target audio signal to obtain a near-end voice signal.

7. The method according to claim 1, wherein the filter sub-blocks are obtained by performing block partitioning on a partitioned-block frequency domain Kalman filter, the partitioned-block frequency domain Kalman filter including at least two filter sub-blocks.

8. The method according to claim 1, wherein the gain coefficient represents an influence of the residual signal prediction value on a state estimation.

9. A computer device comprising:

a memory storing program codes; and a processor configured to execute the program codes to:

obtain a plurality of far-end audio signals outputted by a plurality of channels, respectively;

obtain a first filter coefficient matrix corresponding to a $k^{th}$ frame of microphone signal outputted by a target microphone, comprising:

obtaining a second filter coefficient matrix corresponding to a $(k-1)^{th}$ frame of microphone signal outputted by the target microphone, the first and second filter coefficient matrices respectively including frequency domain filter coefficients of filter sub-blocks corresponding to the plurality of channels, and k being an integer greater than or equal to 1; and determining the first filter coefficient matrix according to the second filter coefficient matrix, a gain coefficient, and a residual signal prediction value corresponding to the $k^{th}$ frame of microphone signal, wherein the residual signal prediction value corresponding to the $k^{th}$ frame of microphone signal represents an echo signal corresponding to a next frame of microphone signal predicted based on the second filter coefficient matrix;

perform frame-partitioning and block-partitioning processing on the plurality of far-end audio signals to determine a far-end frequency domain signal matrix corresponding to the $k^{th}$ frame of microphone signal, the far-end frequency domain signal matrix including far-end frequency domain signals of the filter sub-blocks;

perform filtering processing according to the filter coefficient matrix and the far-end frequency domain signal matrix to obtain an echo signal in the $k^{th}$ frame of microphone signal; and perform echo cancellation according to a frequency domain signal of the $k^{th}$ frame of microphone signal and the echo signal in the $k^{th}$ frame of microphone signal to obtain a near-end audio signal outputted by the target microphone.

10. The device according to claim 9, wherein the processor is further configured to execute the program codes to:

obtain an observation covariance matrix corresponding to the $k^{th}$ frame of microphone signal, and obtain a state covariance matrix corresponding to the $(k-1)^{th}$ frame of microphone signal, the observation covariance matrix and the state covariance matrix being diagonal matrices; and calculate the gain coefficient according to the observation covariance matrix corresponding to the $k^{th}$ frame of microphone signal and the state covariance matrix corresponding to the $(k-1)^{th}$ frame of microphone signal.

11. The device according to claim 10, wherein the processor is further configured to execute the program codes to:

perform filtering processing according to the second filter coefficient matrix and the far-end frequency domain signal matrix to obtain the residual signal prediction value corresponding to the $k^{th}$ frame of microphone signal;

calculate the observation covariance matrix corresponding to the $k^{th}$ frame of microphone signal according to the residual signal prediction value corresponding to the $k^{th}$ frame of microphone signal; and calculate the state covariance matrix corresponding to the $(k-1)^{th}$ frame of microphone signal according to the second filter coefficient matrix.

12. The device according to claim 9, wherein the processor is further configured to execute the program codes to:

obtain the far-end frequency domain signals of the filter sub-blocks corresponding to the plurality of channels using an overlap reservation algorithm according to a preset frame shift and a preset frame length; and form the far-end frequency domain signal matrix using the far-end frequency domain signals of the filter sub-blocks corresponding to the plurality of channels.

13. The device according to claim 9, wherein:

the target microphone is one of a plurality of microphones of a voice communication device; and the processor is further configured to execute the program codes to:

perform signal mixing on near-end audio signals outputted by the plurality of microphones, respectively, to obtain a target audio signal.

14. The device according to claim 13, wherein the processor is further configured to execute the program codes to:

estimate background noise included in the target audio signal; and cancel the background noise from the target audio signal to obtain a near-end voice signal.

15. The device according to claim 9, wherein the filter sub-blocks are obtained by performing block partitioning on a partitioned-block frequency domain Kalman filter, the partitioned-block frequency domain Kalman filter including at least two filter sub-blocks.

16. A non-transitory computer-readable storage medium storing program codes that, when executed by a processor, cause the processor to:

obtain a plurality of far-end audio signals outputted by a plurality of channels, respectively;

obtain a first filter coefficient matrix corresponding to a $k^{th}$ frame of microphone signal outputted by a target microphone, comprising:

obtaining a second filter coefficient matrix corresponding to a $(k-1)^{th}$ frame of microphone signal outputted by the target microphone, the first and second filter coefficient matrices respectively including frequency domain filter coefficients of filter sub-blocks corresponding to the plurality of channels, and k being an integer greater than or equal to 1; and determining the first filter coefficient matrix according to the second filter coefficient matrix, a gain coefficient, and a residual signal prediction value corresponding to the $k^{th}$ frame of microphone signal, wherein the residual signal prediction value corresponding to the $k^{th}$ frame of microphone signal represents an echo signal corresponding to a next frame of microphone signal predicted based on the second filter coefficient matrix;

perform frame-partitioning and block-partitioning processing on the plurality of far-end audio signals to determine a far-end frequency domain signal matrix corresponding to the $k^{th}$ frame of microphone signal, the far-end frequency domain signal matrix including far-end frequency domain signals of the filter sub-blocks;

perform filtering processing according to the filter coefficient matrix and the far-end frequency domain signal matrix to obtain an echo signal in the $k^{th}$ frame of microphone signal; and perform echo cancellation according to a frequency domain signal of the $k^{th}$ frame of microphone signal and the echo signal in the $k^{th}$ frame of microphone signal to obtain a near-end audio signal outputted by the target microphone.

17. The storage medium according to claim 16, wherein the program codes further cause the processor to:

obtain an observation covariance matrix corresponding to the $k^{th}$ frame of microphone signal, and obtain a state covariance matrix corresponding to the $(k-1)^{th}$ frame of microphone signal, the observation covariance matrix and the state covariance matrix being diagonal matrices; and calculate the gain coefficient according to the observation covariance matrix corresponding to the $k^{th}$ frame of microphone signal and the state covariance matrix corresponding to the $(k-1)^{th}$ frame of microphone signal.

18. The storage medium according to claim 17, wherein the program codes further cause the processor to:

perform filtering processing according to the second filter coefficient matrix and the far-end frequency domain signal matrix to obtain the residual signal prediction value corresponding to the $k^{th}$ frame of microphone signal;

calculate the observation covariance matrix corresponding to the $k^{th}$ frame of microphone signal according to the residual signal prediction value corresponding to the $k^{th}$ frame of microphone signal; and calculate the state covariance matrix corresponding to the $(k-1)^{th}$ frame of microphone signal according to the second filter coefficient matrix.

* * * * *